United States Patent
Iida et al.

(10) Patent No.: US 9,430,722 B2
(45) Date of Patent: Aug. 30, 2016

(54) CONTROL APPARATUS, CONTROL METHOD, AND STORAGE MEDIUM TO NOTIFY USERS OF SHEET HOLDING UNITS

(71) Applicant: CANON KABUSHIKI KAISHA, Tokyo (JP)

(72) Inventors: Toshihiko Iida, Yokohama (JP); Yoshiji Kanamoto, Tokyo (JP); Hisashi Koike, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/824,398

(22) Filed: Aug. 12, 2015

(65) Prior Publication Data

US 2015/0347878 A1 Dec. 3, 2015

Related U.S. Application Data

(63) Continuation of application No. 14/452,409, filed on Aug. 5, 2014, now Pat. No. 9,141,322.

(30) Foreign Application Priority Data

Aug. 8, 2013 (JP) ................................. 2013-165349

(51) Int. Cl.
G06K 15/02 (2006.01)
G06K 15/00 (2006.01)
G06F 3/12 (2006.01)

(52) U.S. Cl.
CPC ........... *G06K 15/1803* (2013.01); *G06F 3/121* (2013.01); *G06F 3/1235* (2013.01); *G06F 3/1255* (2013.01); *G06F 3/1258* (2013.01); *G06K 15/002* (2013.01)

(58) Field of Classification Search
USPC ........... 358/1.15, 1.14, 1.16, 1.9; 399/81, 82
See application file for complete search history.

(56) References Cited

U.S. PATENT DOCUMENTS

| | | | |
|---|---|---|---|
| 2008/0174818 A1* | 7/2008 | Kanamoto | G03F 3/1204 358/1.15 |
| 2009/0059286 A1* | 3/2009 | Yamaguchi | H04N 1/0032 358/1.15 |
| 2011/0199644 A1* | 8/2011 | Asai | B42C 19/02 358/1.15 |
| 2012/0163851 A1* | 6/2012 | Masuyama | G03G 15/6508 399/81 |

FOREIGN PATENT DOCUMENTS

| | | |
|---|---|---|
| CN | 1438569 A | 8/2003 |
| CN | 1453697 A | 11/2003 |
| CN | 1497423 A | 5/2004 |
| CN | 101655685 A | 2/2010 |
| JP | 2010284919 A | 12/2010 |

* cited by examiner

*Primary Examiner* — Allen H Nguyen
(74) *Attorney, Agent, or Firm* — Canon USA, Inc. IP Division

(57) ABSTRACT

A printing apparatus includes a job holding unit, a selecting unit, a performing unit, a displaying unit, and a notification unit. The job holding unit holds jobs that print an image on a sheet conveyed from at least one of sheet holding units. The selecting unit selects a job from the job holding unit. The receiving unit receives, from a user, an instruction to execute the selected job. The performing unit performs the job per the instruction. The displaying unit displays a screen for selecting at least one of the sheet holding units for which attribute information of a sheet, to be used in a selected first job, is to be stored. The notification unit notifies, on the screen in a distinguishable manner, a user of at least one of the sheet holding units which is and another which is not used in printing of a second job.

20 Claims, 27 Drawing Sheets

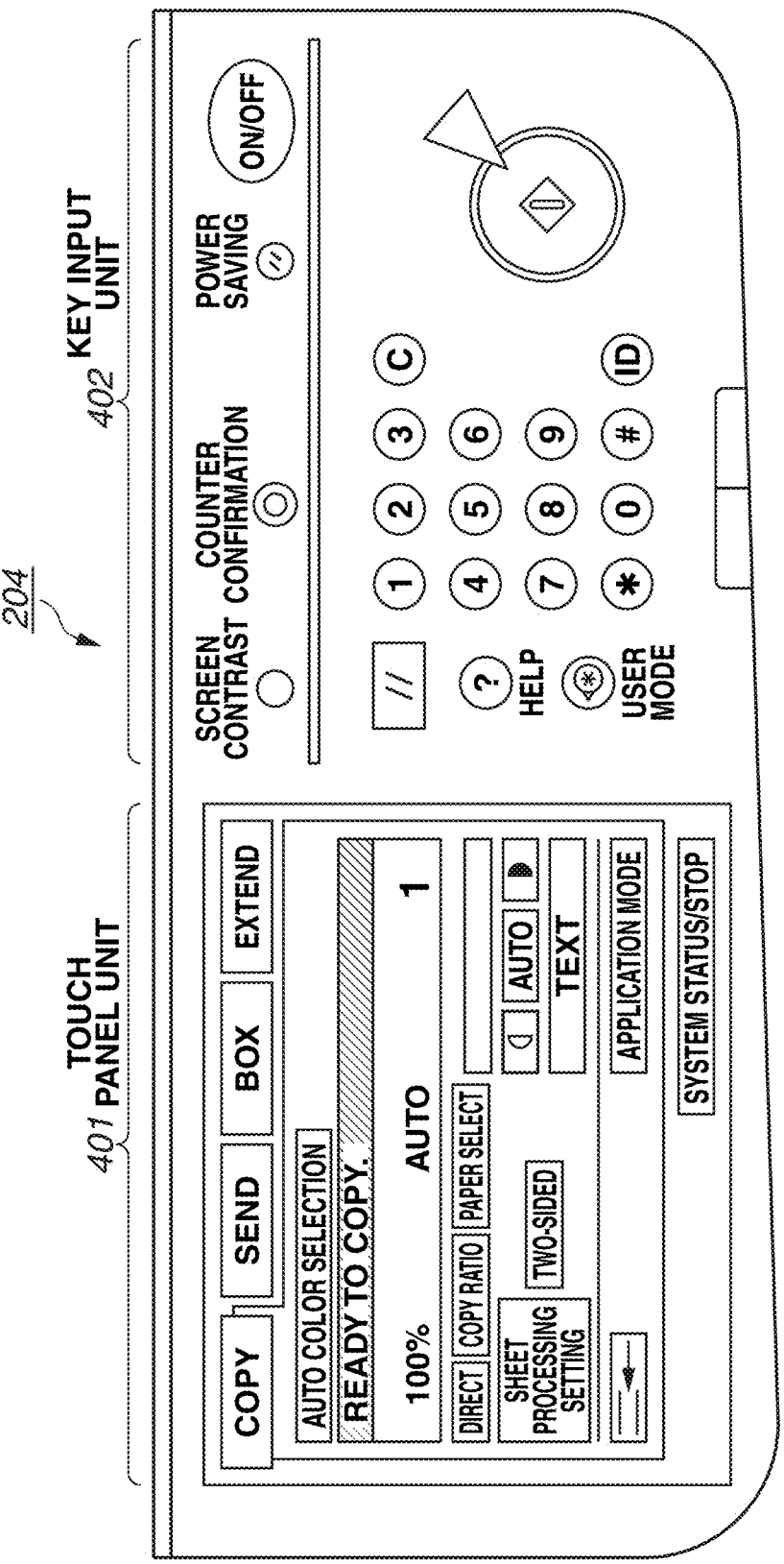

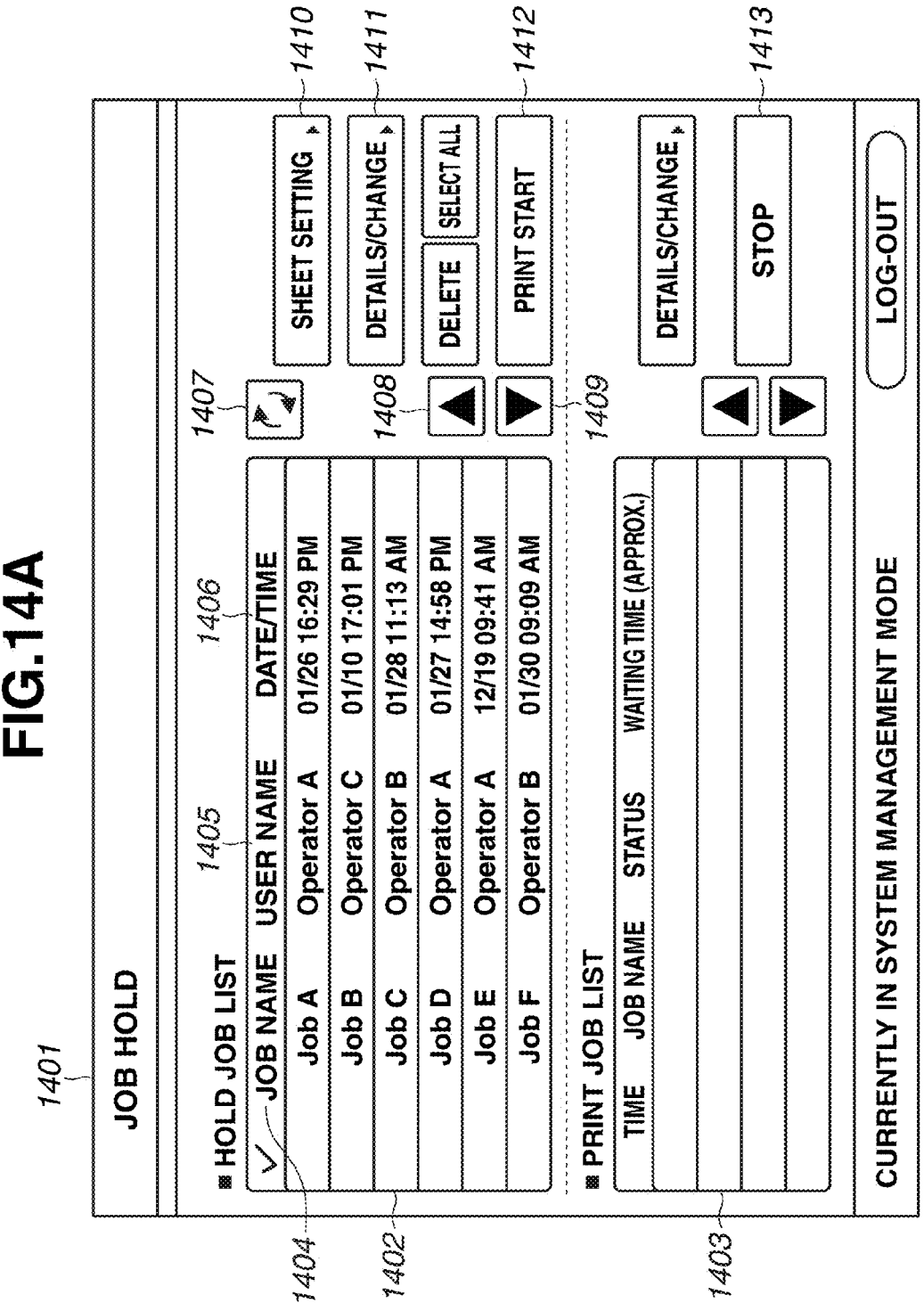

FIG.14B

JOB HOLD — 1401

■ HOLD JOB LIST

| | JOB NAME | USER NAME | DATE/TIME |
|---|---|---|---|
| ✓ | | | |
| 1 ✓ | Job A | Operator A | 01/26 16:29 PM |
| | Job B | Operator C | 01/10 17:01 PM |
| | Job C | Operator B | 01/28 11:13 AM |
| 2 ✓ | Job D | Operator A | 01/27 14:58 PM |
| 3 ✓ | Job E | Operator A | 12/19 09:41 AM |
| | Job F | Operator B | 01/30 09:09 AM |

- 1407: ↻
- 1408: ◀ ▶
- 1410: SHEET SETTING
- 1411: DETAILS/CHANGE
- DELETE | SELECT ALL
- 1412: PRINT START

■ PRINT JOB LIST

| TIME | JOB NAME | STATUS | WAITING TIME (APPROX.) |
|---|---|---|---|
| 10:11 AM | Job X | printing | 1 minute |
| 10:12 AM | Job Y | waiting | 2 minutes |

— 1414

- 1409: ◀ ▶
- DETAILS/CHANGE
- 1413: STOP
- LOG-OUT

CURRENTLY IN SYSTEM MANAGEMENT MODE 1421, 1402, 1422, 1423, 1424, 1403

FIG.14C

JOB HOLD — 1401

■ HOLD JOB LIST

| | JOB NAME | USER NAME | DATE/TIME |
|---|---|---|---|
| ✓ | | | — 1414 |
| 1✓ | Job A | Operator A | 01/26 16:29 PM |
| | Job B | Operator C | 01/10 17:01 PM |
| | Job C | Operator B | 01/28 11:13 AM |
| 2✓ | Job D | Operator A | 01/27 14:58 PM |
| 3✓ | Job E | Operator A | 12/19 09:41 AM ▦ ❗ |
| | Job F | Operator B | 01/30 09:09 AM |

1421, 1402, 1422, 1423, 1424, 1431, 1432

1407, 1408, 1409

- SHEET SETTING ▲ — 1410
- DETAILS/CHANGE ▲ — 1411
- DELETE | SELECT ALL
- PRINT START — 1412

■ PRINT JOB LIST

| TIME | JOB NAME | STATUS | WAITING TIME (APPROX.) |
|---|---|---|---|
| 10:11 AM | Job X | printing | 1 minute |
| 10:12 AM | Job Y | waiting | 2 minutes |

1403

- DETAILS/CHANGE ▲
- STOP — 1413
- LOG-OUT

CURRENTLY IN SYSTEM MANAGEMENT MODE

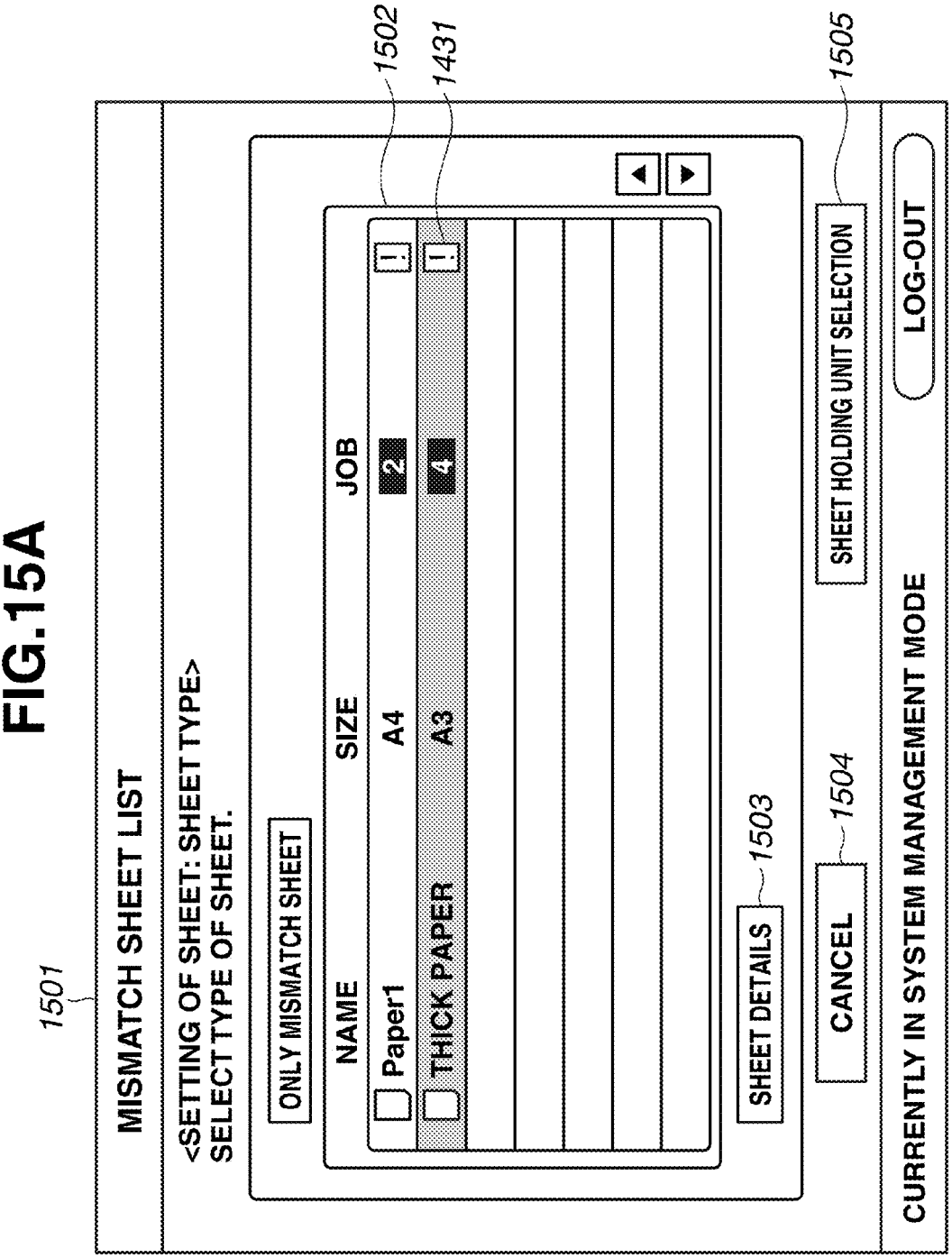

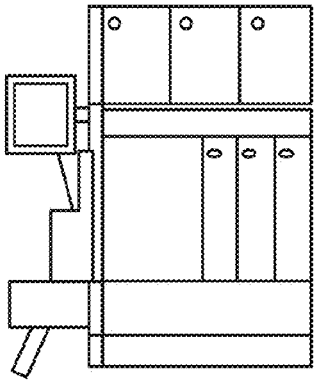

SHEET DETAILS INFORMATION

<DETAILS>
CONFIRM SHEET DETAILS INFORMATION.

- ■ SHEET NAME
  THICK PAPER
- ■ SIZE ▶ A3
- ■ GRAMMAGE ▶ 110 g/m²
- ■ SURFACE PROPERTY ▶ FINE QUALITY PAPER
- ■ FEATURE ▶ NONE
- ■ COLOR ▶ WHITE
- ■ ADJUSTMENT OF CREEP (DEVIATION) CORRECTION ▶ 0.00 mm

OK

CURRENTLY IN SYSTEM MANAGEMENT MODE

LOG-OUT

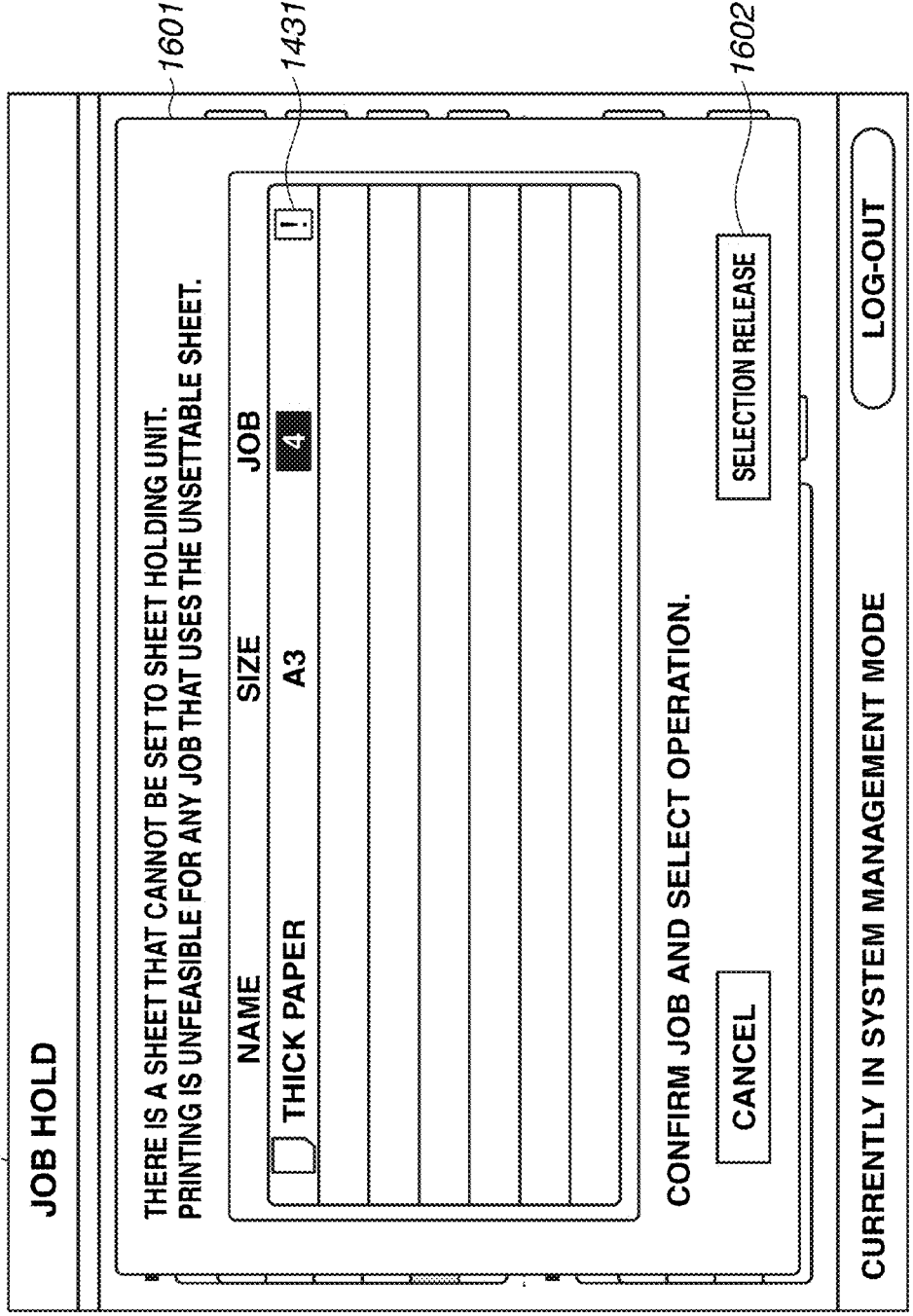

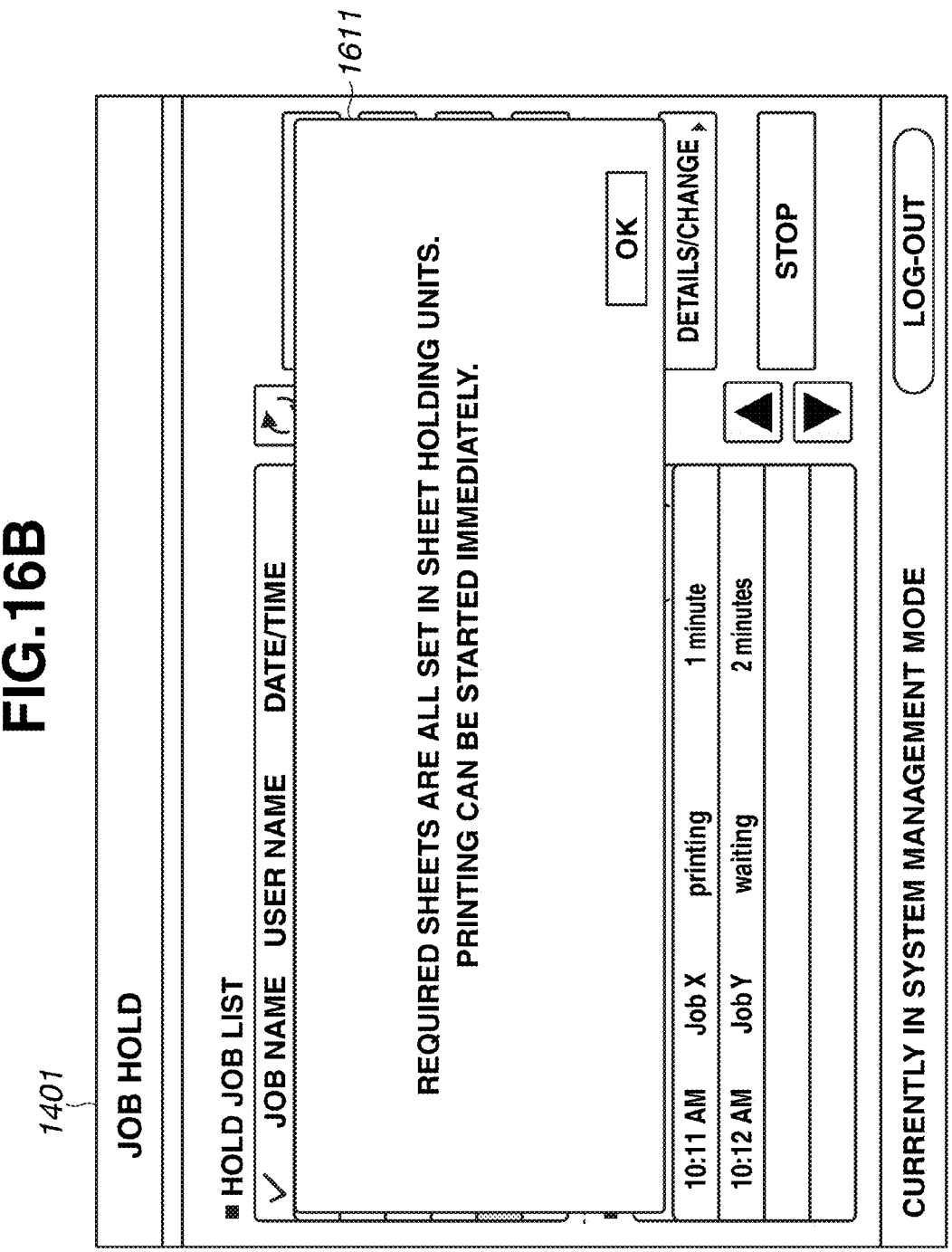

FIG.17A

| SHEET HOLDING UNIT ID | SIZE | MEDIA TYPE | REMAINING AMOUNT |
|---|---|---|---|
| 1 | A4 | PLAIN PAPER 1 | 3 |
| 2 | A4 | COLORED PAPER (RED) | 1 |
| 3 | A3 | PLAIN PAPER 1 | 2 |
| 4 | B4 | PLAIN PAPER 1 | 0 |
| 5 | B5 | PLAIN PAPER 1 | 3 |
| 6 | A4 | INDEX PAPER | 3 |
| 7 | LTR | PLAIN PAPER 1 | 1 |
| 8 | A4 | TWO-SIDED COATED PAPER 1 | 1 |
| 9 | 11×17 | PLAIN PAPER 1 | 0 |
| 10 | A3 | THICK PAPER 2 | 0 |

FIG.17B

Job A

| SIZE | MEDIA TYPE |
|---|---|
| A4 | PLAIN PAPER 1 |
| A4 | TWO-SIDED COATED PAPER 1 |

Job D

| SIZE | MEDIA TYPE |
|---|---|
| LTR | PLAIN PAPER 1 |
| 11×17 | PLAIN PAPER 1 |

Job E

| SIZE | MEDIA TYPE |
|---|---|
| A4 | PLAIN PAPER 1 |
| A4 | COLORED PAPER (RED) |
| A3 | TWO-SIDED COATED PAPER 2 |

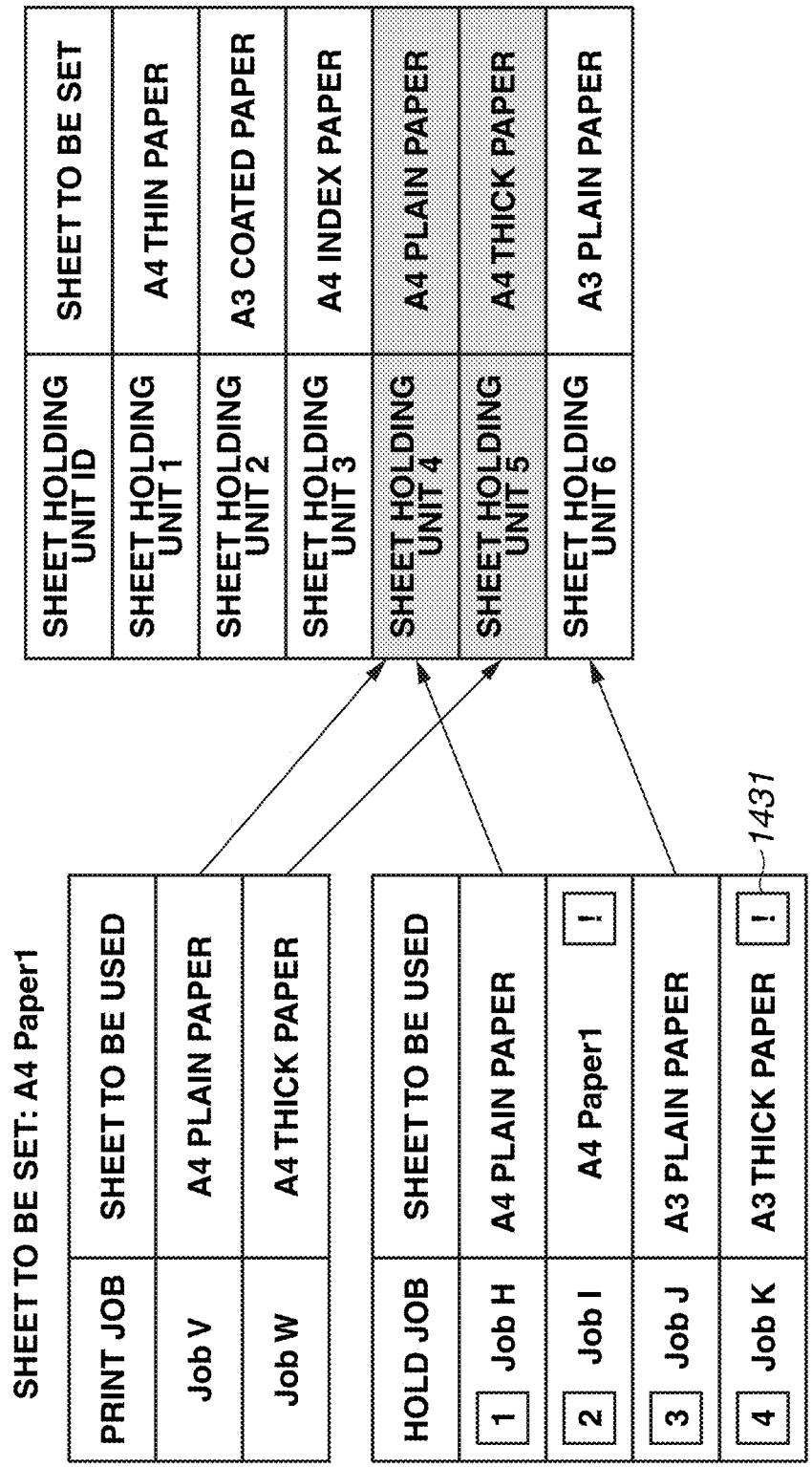

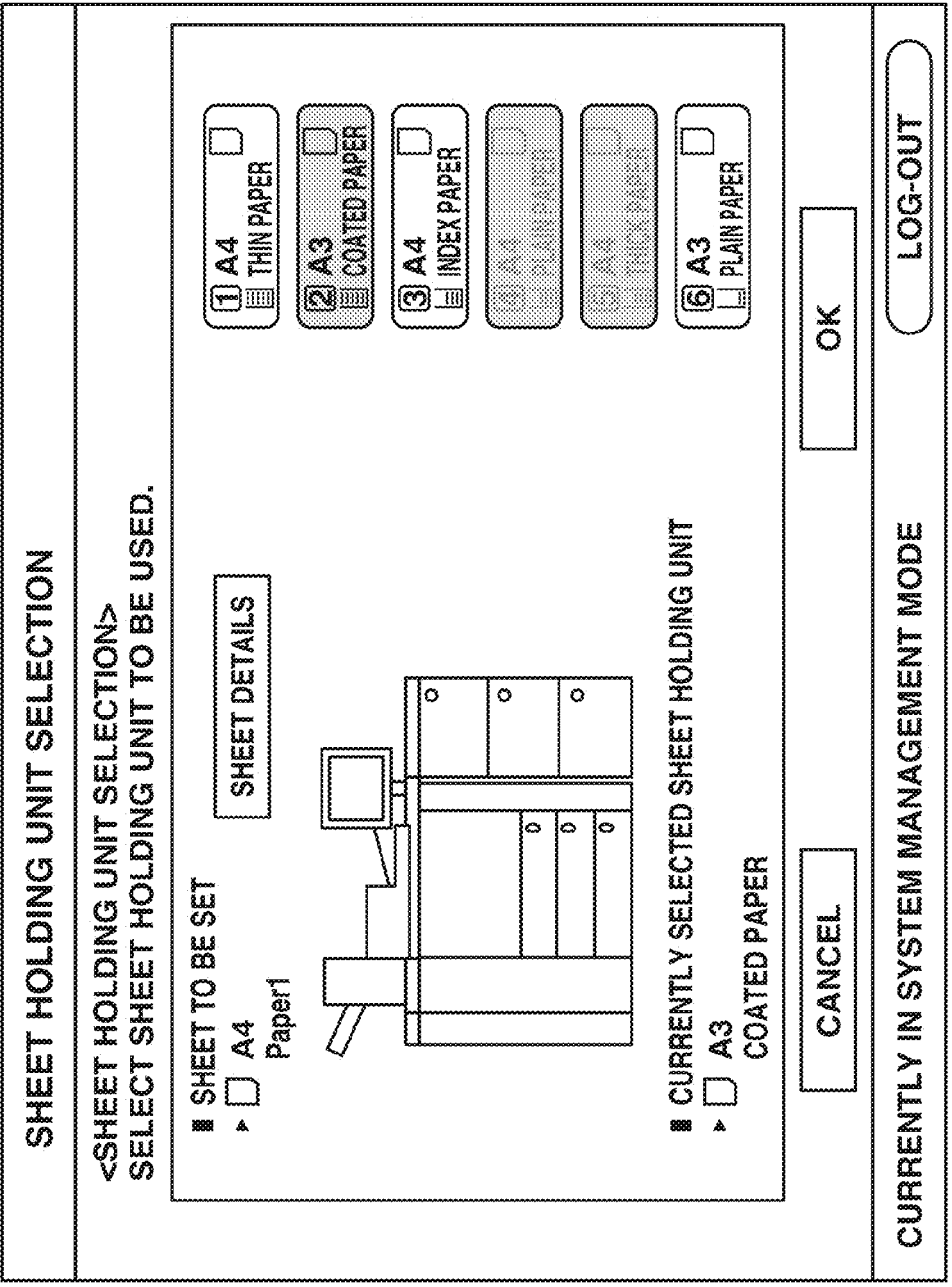

CONTROL APPARATUS, CONTROL METHOD, AND STORAGE MEDIUM TO NOTIFY USERS OF SHEET HOLDING UNITS

CROSS REFERENCE TO RELATED APPLICATIONS

The present application is a continuation of U.S. patent application Ser. No. 14/452,409, filed on Aug. 5, 2014, which claims priority from Japanese Patent Application No. 2013-165349, filed Aug. 8, 2013, all of which are hereby incorporated by reference herein in their entirety.

BACKGROUND OF THE INVENTION

1. Field of the Invention

The present invention relates to a control apparatus that can store a print job and execute the stored print job. Further, the present invention relates to a related control method and a storage medium.

2. Description of the Related Art

As discussed in Japanese Patent Application Laid-Open No. 2010-284919, it is conventionally known that a printing apparatus includes a plurality of sheet holding units and an operation screen can notify a user that attribute information (e.g., sheet size) about a sheet to be used in a print job is not registered to any one of the sheet holding units.

Further, as discussed in Japanese Patent Application Laid-Open No. 2010-49167, it is conventionally known that an operation screen can display a list of print job status information, so that a user can know that the size of a sheet to be used in a print job is not registered to any one of a plurality of sheet holding units or that the remaining amount of sheets to be used in a print job is zero.

If attribute information about a sheet to be used in a print job is not registered to any one of a plurality of sheet holding units, the execution of the print job will be stopped. In such a case, to prevent the execution of the print job from being stopped, it is required for a user to change sheet attribute information registered to any one of the sheet holding units to the attribute information about the sheet to be used in the print job. In this case, attribute information about a sheet holding unit to be used in another print job may be changed unintentionally and accordingly the execution of another print job may stop.

SUMMARY OF THE INVENTION

According to an aspect of the present invention, a printing apparatus includes a job holding unit configured to hold jobs, wherein each of the jobs is configured to perform printing an image on a sheet which is conveyed from at least one of sheet holding units, a selecting unit configured to select a job from among the jobs held by the job holding unit, a receiving unit configured to receive, from a user, an execution instruction to execute the job selected by the selecting unit, a performing unit configured to perform the job for which the execution instruction is received by the receiving unit, a displaying unit configured to display a screen for selecting at least one of the sheet holding units for which attribute information of a sheet, to be used in a first job selected by the selecting unit, is to be stored, and a notification unit configured to notify, on the screen in a distinguishable manner, a user of at least one of the sheet holding units which is used in printing of a second job and at least one of the sheet holding units which is not used in printing of the second job.

When attribute information about a sheet to be used in a target print job is registered to none of sheet holding units provided in a printing apparatus, it is necessary to change sheet attribute information registered to any one of the sheet holding units to the attribute information about the sheet to be used in the target print job. A control apparatus performs control in such a way as to prevent attribute information about a sheet to be used in a first job from being stored for a sheet holding unit in which attribute information about a sheet to be used in a second job selected at earlier timing than the first job corresponds to sheet attribute information stored in a storage unit. Further features of the present invention will become apparent from the following description of exemplary embodiments with reference to the attached drawings.

BRIEF DESCRIPTION OF THE DRAWINGS

FIG. 4 is a plan view illustrating an operation unit of the digital printing machine according to the first exemplary embodiment.

FIG. 14A illustrates an example of a job hold function operation screen that can be displayed on the operation unit of the digital printing machine according to the first exemplary embodiment, FIG. 14B illustrates another example of the job hold function operation screen that can be displayed on the operation unit of the digital printing machine according to the first exemplary embodiment, and FIG. 14C illustrates another example of the job hold function operation screen that can be displayed on the operation unit of the digital printing machine according to the first exemplary embodiment.

FIG. 15A illustrates an example of a sheet setting screen (mismatch sheet list screen) that can be displayed on the operation unit of the digital printing machine according to the first exemplary embodiment, and FIG. 15B illustrates an example of a sheet setting screen (sheet holding unit selection screen) that can be displayed on the operation unit of the digital printing machine according to the first exemplary embodiment, and FIG. 15C illustrates an example of a sheet setting screen (sheet details information screen) that can be displayed on the operation unit of the digital printing machine according to the first exemplary embodiment.

FIG. 16A illustrates an example of a warning screen that can be displayed on the operation unit of the digital printing machine according to the first exemplary embodiment, and FIG. 16B illustrates an example of a notification screen that can be displayed on the operation unit of the digital printing machine according to the first exemplary embodiment.

FIG. 17A illustrates an example of a sheet management table that can be used to manage the information about a sheet stored in each sheet holding unit of the digital printing machine according to the first exemplary embodiment, and FIG. 17B illustrates an example of information about sheets to be used in a plurality of jobs in the digital printing machine according to the first exemplary embodiment.

FIG. 20 illustrates a sheet holding unit related determination result, which can be obtained by the digital printing machine according to the second exemplary embodiment.

FIG. 21 illustrates an example of a sheet holding unit selection screen that can be displayed on the operation unit of the digital printing machine according to the second exemplary embodiment.

DESCRIPTION OF THE EMBODIMENTS

Various exemplary embodiments, features, and aspects of the invention will be described in detail below with reference to attached drawings. The following description of the exemplary embodiments does not intend to limit the scope of the present invention. Further, although the following exemplary embodiments include various characteristic features, it should be construed that all of the described features and their combinations are not always necessary to constitute the essential features of the present invention.

Figure 1:
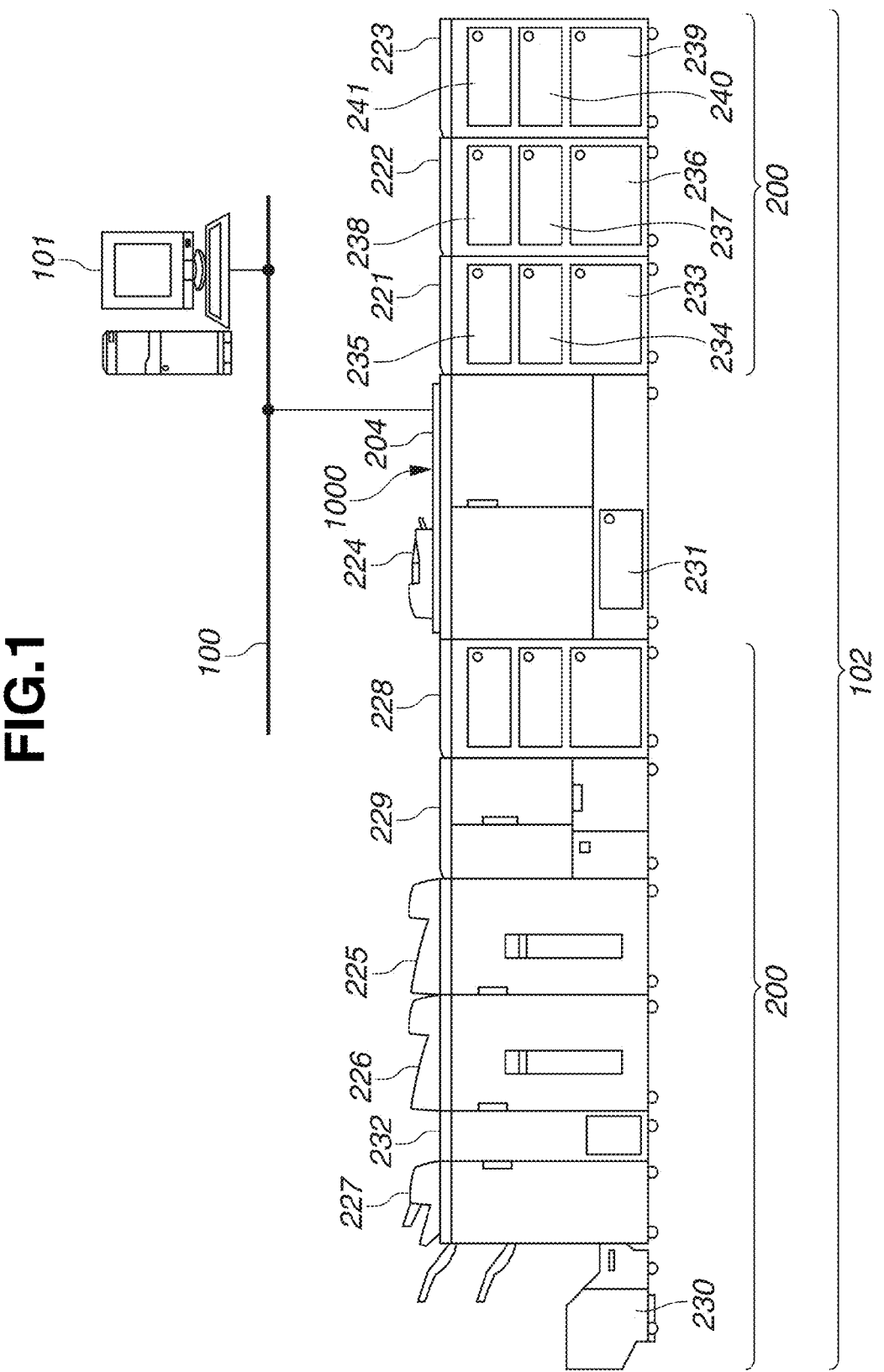
FIG. 1 illustrates a digital printing system according to a first exemplary embodiment of the present invention.

A digital printing system according to a first exemplary embodiment of the present invention is described in detail blow with reference to FIG. 1. The printing system illustrated in FIG. 1 includes a digital printing machine (i.e., a printing apparatus) 102 and a computer 101, which are connected to each other via a network 100.

The digital printing machine 102 includes a plurality of apparatuses having unique roles, which are mutually connected and constituted in such a way as to perform complicated sheet processing.

The digital printing machine 102 can be roughly divided into three sections, one of which is a printer unit 1000. As illustrated in FIG. 1, there is a plurality of sheet holding apparatuses disposed on the right side of the printer unit 1000. The main role of each sheet holding apparatus is successively supplying sheets stored therein to the printer unit 1000 at appropriate timing. Further, each sheet holding apparatus is equipped with a sensor (not illustrated) that can detect the remaining amount of sheets stored therein. The printer unit 1000 includes a sheet holding unit 231, which is functionally operable as a built-in sheet holding apparatus. In the following description, the sheet holding unit of the printer unit 1000 is referred to as the sheet holding apparatus. Each constituent component of the digital printing machine 102 is described in detail below.

The printer unit 1000 can form (or print) a toner image on a recording medium (e.g., a sheet), which can be supplied from the sheet holding unit, based on image data. The printer unit 1000 has the following configuration and can operate in the following manner.

The printer unit 1000 irradiates a photosensitive drum with scanning light, such as a laser beam, which has been modulated based on the image data and reflected by a rotary polygon mirror. The printer unit 1000 develops an electrostatic latent image with toner particles after the latent image is formed on the photosensitive drum, and transfers a developed toner image onto a sheet pressed against a transfer drum. The printer unit 1000 sequentially performs the above-mentioned sequential image forming processes using yellow (Y), magenta (M), cyan (C), and black (K) toners to form a full-color image on the sheet. Further, the toner colors to be used by the printer unit 1000 are not limited to the above-mentioned four colors. For example, the toner colors that the printer unit 1000 can use include special colors in addition to the above-mentioned four colors. Further, the printer unit 1000 can be configured to transfer transparent toners. The printer unit 1000 conveys the printed sheet, after the above-mentioned full-color image has been formed thereon, from the transfer drum to a fixing device. The fixing device includes rollers and belts. The fixing device includes a heat source (e.g., a halogen heater) incorporated in the roller and can apply heat and pressure to melt and fix the image on the sheet after the image has been transferred on the sheet. The printer unit 1000 is not limited to an electrophotographic type and can be any other printer, such as an inkjet printer or a thermal transfer printer.

The printer unit 1000 of the digital printing machine 102 according to the first exemplary embodiment includes a scanner (not illustrated) and an operation unit 204 (see FIG. 4) that are disposed on an upper surface of the printer unit 1000. The operation unit 204 is not illustrated in FIG. 1 because the operation unit 204 is disposed on the upper surface of the printer unit 1000. The operation unit 204 provides various interfaces that allow a user to perform various settings and operations for the printer unit 1000 according to the first exemplary embodiment. The printer unit 1000 further includes a document feeder 224 that is provided on a main body thereof together with the scanner.

Further, the digital printing machine 102 is configured to have various attachable optional apparatuses in addition to the printer unit 1000.

Each of mass-storage sheet holding apparatuses 221, 222, and 223 is an example of the sheet holding apparatus that is directly or indirectly attachable to and detachable from the printer unit 1000. These sheet holding apparatuses include a plurality of sheet holding units 233 to 241. Each of a plurality of sheet holding units 233 to 241 is equipped with a sensor that can detect the remaining amount of sheets stored therein. The printer unit 1000 having the above-mentioned configuration can perform print processing on massively stored sheets. Although the printing system illustrated in FIG. 1 includes only three mass-storage sheet holding apparatuses 221, 222, and 223 that are sequentially connected, the number of the sheet holding apparatuses is not limited to the illustrated example. The printing system can be configured to include only one mass-storage sheet holding apparatus 221. Further, each of the plurality of sheet holding units can be a paper feed tray or a manual feed tray. For example, at least one manual feed tray can be combined with two or more paper feed trays.

Each of mass-storage stackers 225 and 226 is an apparatus that can stock printed sheets. The system including the above-mentioned mass-storage sheet holding apparatuses generates massive print products. This is the reason why the system requires the above-mentioned mass-storage stackers. However, the number of the mass-storage stackers and the number of the mass-storage sheet holding apparatuses are not limited to the configuration illustrated in FIG. 1. Although the printing system illustrated in FIG. 1 includes only two mass-storage stackers 225 and 226 that are sequentially connected, the number of the stackers is not limited to the illustrated example. For example, the printing system illustrated in FIG. 1 can be configured to include only one mass-storage stacker 225.

Each of the mass-storage stackers 225 and 226 includes a door that can be opened to take stacked sheets out of an internal stacking tray in response to a user's instruction operation. Further, the door of each mass-storage stacker can be automatically opened in response to an instruction from the printer unit 1000. Before the printing system performs the above-mentioned door opening operation, the printing system stops the processing to stack printed sheets to respective mass-storage stackers 225 and 226.

Further, when respective mass-storage stackers 225 and 226 stack printed sheets, the mass-storage stackers 225 and 226 can shift the stacking position of an arbitrary sheet. This function is referred to as a shift paper output function. A predetermined amount of massively stacked sheets can be sorted to form a single bundle.

A folding apparatus 232 is an apparatus that can perform various folding processing (e.g., center folding, Z folding, three-part folding, and four-part folding) on each sheet.

A saddle stitch bookbinding machine 227 includes various units that can perform staple processing, saddle stitch or saddle folding processing (required to output bookbinding products), punch processing, and shift paper output processing, on sheets printed by the printer unit 1000. When the saddle stitch bookbinding machine 227 generates a saddle stitch binding output product, the digital printing machine 102 described in the first exemplary embodiment forms the output product by combining a saddle folding function and a saddle stitch function of the saddle stitch bookbinding machine 227, without using a folding function of the folding apparatus 232.

A sheet cutting apparatus 230 is an apparatus that can convey a bookbinding output product, after the output product is stitched by the saddle stitch bookbinding machine 227, and can cut a predetermined edge region corresponding to the front edge portion to finish the front edge to have a flat surface.

An inserter 228 can hold an arbitrary sheet and insert the held sheet into a plurality of sheets supplied from the printer unit 1000 at appropriate timing, based on settings. For example, the inserter 228 can insert a sheet that does not require any printing into printed sheets. The inserter 228 includes a plurality of mass-storage sheet holding portions, which are similar to the mass-storage sheet holding apparatuses 221, 222, and 223, so that the digital printing machine 102 can realize mass-storage print processing.

A case bookbinding machine 229 is an apparatus that can perform front page pasting processing on a sheet bundle printed by the printer unit 1000 or output from the inserter 228 to form a case bookbinding output product. Further, the case bookbinding machine 229 can perform top paste bookbinding processing, which corresponds to working process to perform pasting and bookbinding without using a front page.

The folding apparatus 232, the saddle stitch bookbinding machine 227, the sheet cutting apparatus 230, the inserter 228, and the case bookbinding machine 229 can be configured to be incorporated in or independent of the digital printing machine 102.

On the other hand, in FIG. 1, the mass-storage stackers 225 and 226 (i.e., the devices that stack sheets) and other devices disposed on the left side of the printer unit 1000 are referred to as sheet working apparatuses. The sheet working apparatus may also be referred to as a sheet processing apparatus or a post-processing apparatus. The sheet working apparatus can also apply various working processes to sheets that have been subjected to the print processing. The above-mentioned sheet holding apparatuses and the sheet working apparatuses are collectively referred to as a sheet processing apparatus 200.

Figure 2:
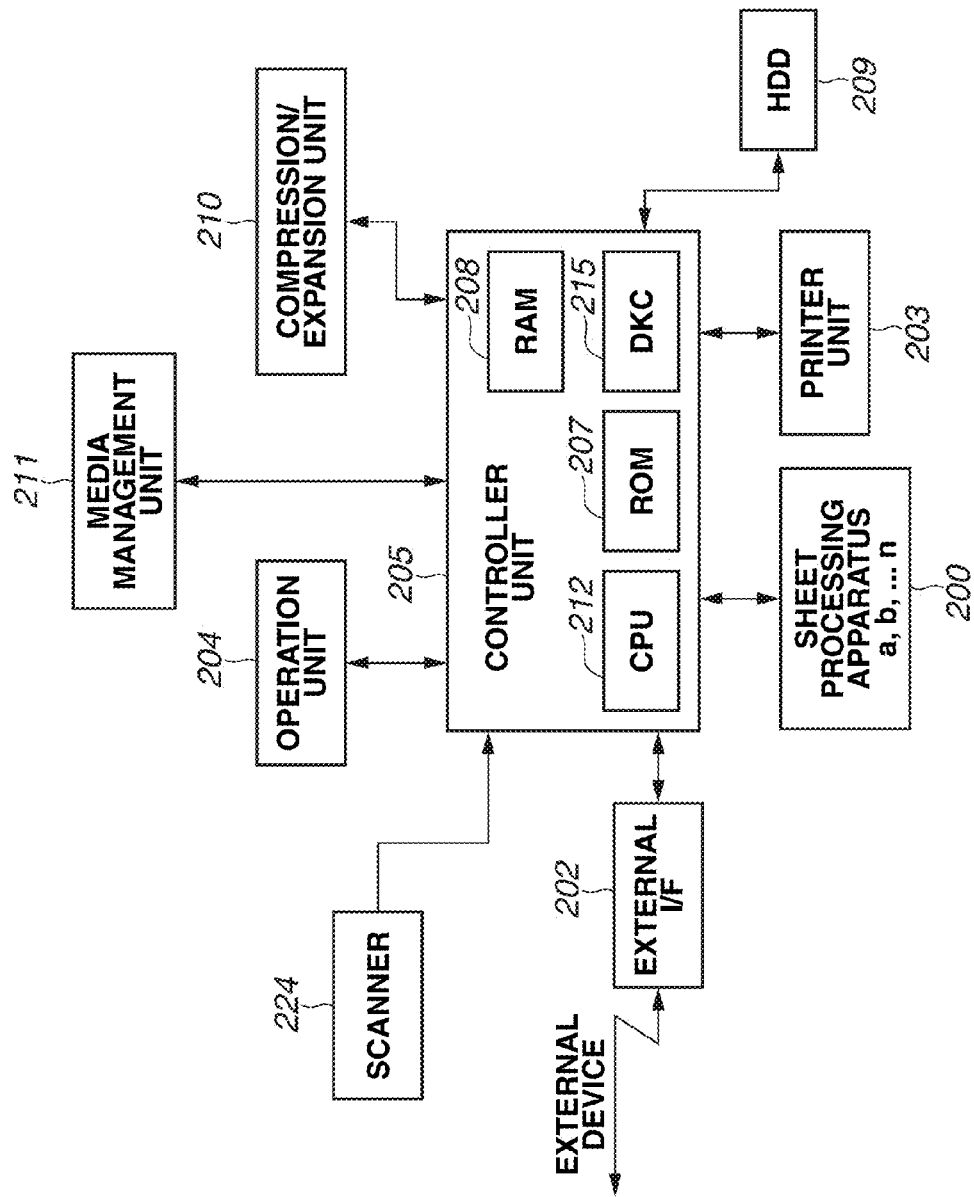
FIG. 2 is a functional block diagram illustrating a functional configuration of a digital printing machine according to the first exemplary embodiment.

Next, a circuit configuration of the digital printing machine 102 according to the first exemplary embodiment is described in detail below with reference to a functional block diagram illustrated in FIG. 2. The configuration illustrated in FIG. 2 can be applied to the above-mentioned sheet processing apparatus, such as the sheet holding apparatuses and the sheet processing apparatuses.

The digital printing machine 102 includes a built-in nonvolatile memory (i.e., a storing unit), such as a hard disk drive 209 (hereinafter, referred to as "HDD"), which can store a plurality of jobs (i.e., processing targets). However, the built-in memory of the digital printing machine 102, which has been employed in the first exemplary embodiment, is not limited to the hard disk drive. For example, the HDD 209 can be replaced by a similar mass-storage and nonvolatile storage apparatus. The HDD 209 can be replaced by a solid state drive (SSD) or a similar nonvolatile memory.

Further, the digital printing machine 102 can receive data from the scanner and store the received data in the HDD 209. Then, the digital printing machine 102 can cause a printer unit 203 to perform printing based on the data read out of the HDD 209. In other words, the digital printing machine 102 can execute a copy job. Further, the digital printing machine 102 can receive a job from an external apparatus via an external I/F 202 (i.e., an example of a communication unit)

and store the received job in the HDD 209. Then, the digital printing machine 102 can cause the printer unit 203 to perform printing based on the data read out of the HDD 209. The function of the digital printing machine 102 in this case is referred to as a print function. The digital printing machine 102 is a multi-function peripheral (MFP) having the above-mentioned plurality of functions, which may be referred to as an image forming apparatus. The digital printing machine 102 can perform color print processing or can perform monochrome print processing.

The scanner can read an image of a document to be processed and perform image processing on the read image data to output a processed image. The external I/F 202 can transmit and receive image data to and from an external apparatus. For example, the external apparatus is a facsimile, a network connection device, or an external dedicated device. Further, the HDD 209 stores various kinds of management information, which the digital printing machine 102 can permanently store, change, and manage. Further, the digital printing machine 102 includes the printer unit 203 that performs print processing for a print target job stored in the HDD 209. The operation unit 204 of the digital printing machine 102 includes a display unit, which corresponds to an example of a user interface unit. A controller unit (i.e., a control unit) 205 of the digital printing machine 102 includes a CPU 212, which can integrally control processing and operations to be performed by various units provided in the digital printing machine 102. Further, the controller unit (i.e. the control unit) includes a read only memory (ROM) 207 and a random access memory (RAM) 208, which can be operated as the storing unit. The ROM 207 and the RAM 208 store various control programs, which can be executed by the CPU 212 to execute various processing of flowcharts described in detail below. Further, the ROM 207 stores a display control program, which can be executed by the CPU 212 to display various UI screens on the display unit of the operation unit 204.

The CPU 212 of the controller unit 205 executes programs read out of the ROM 207 to cause the digital printing machine 102 to perform various operations according to the first exemplary embodiment. Further, the CPU 212 interprets page description language (hereinafter, referred to as "PDL") data when the PDL data is received from an external apparatus via the external I/F 202. The CPU 212 performs an operation to develop the PDL data into raster image data (bitmap image data). The program that causes the CPU 212 to perform the above-mentioned operations is stored in the ROM 207. Similarly, a program that causes the CPU 212 to interpret and process a print job received from an external apparatus via the external I/F 202 is stored in the ROM 207. The above-mentioned operations can be processed by software programs. The ROM 207 is a read only memory that stores a boot sequence program and a font information program beforehand. Various programs stored in the ROM 207 are described in detail below. The RAM 208 is a readable and writable memory, which can store image data received from the scanner and the external I/F 202, various programs, and setting information.

Further, the HDD 209 preliminarily stores various programs described below. Image data compressed by a compression/expansion unit 210 can be also stored in the HDD 209. The HDD 209 is constituted to store a plurality of pieces of data, including print data of a processing target job. The controller unit 205 can store processing target jobs input via various input units (e.g., the scanner and the external I/F 202) in the HDD 209. The controller unit 205 can read a processing target job from the HDD 209 and output the target job to the printer unit 203 to cause the printer unit 203 to perform printing. Further, the controller unit 205 can read a job from the HDD 209 and can transmit the job to an external apparatus via the external I/F 202. As mentioned above, the controller unit 205 can execute various output processing for the processing target jobs stored in the HDD 209. In the present exemplary embodiment, the HDD 209 is a mere example and can be replaced by a volatile RAM. The compression/expansion unit 210 can compress and expand image data stored in the RAM 208 and the HDD 209 using an appropriate compression method (e.g., JBIG or JPEG).

A disk controller (DKC) 215 of the controller unit 205 can control every access to the HDD 209.

Further, the controller unit 205 can control various operations to be performed by the sheet processing apparatus 200. The sheet processing apparatus 200 corresponds to the sheet holding apparatuses and the sheet processing apparatuses illustrated in FIG. 1. A media management unit 211 is a module that can manage information about the type of each sheet that can be processed by the digital printing machine 102. The information about the type of each sheet that can be processed by the digital printing machine 102 is stored in the HDD 209.

The computer 101 is a general computer, which is connected to the digital printing machine 102 via the network 100. The computer 101 can execute various application programs and can transmit print jobs to the digital printing machine 102.

Figure 3:
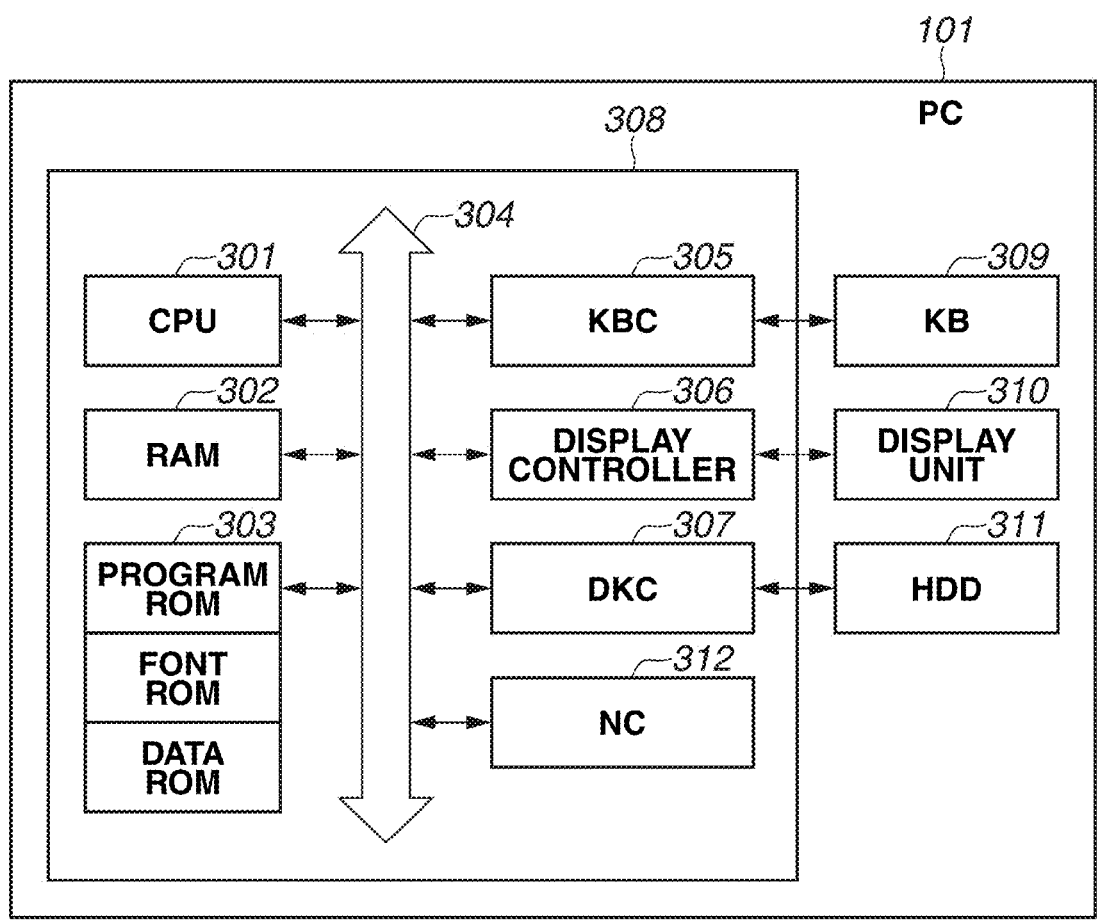
FIG. 3 is a block diagram illustrating a hardware configuration of a computer (PC) according to the first exemplary embodiment.

A configuration of the computer (PC) 101 illustrated in FIG. 1 according to the first exemplary embodiment is described in detail below with reference to a hardware block diagram illustrated in FIG. 3. In FIG. 3, a CPU 301 can execute various programs, including an operating system (OS), general applications, and bookbinding applications, which are stored in a program ROM of a ROM 303 or loaded into a RAM 302 from a HDD 311. The ROM 303 further includes a font ROM and a data ROM. The RAM 302 is functionally operable as a main memory or a work area for the CPU 301. A keyboard controller (KBC) 305 can control various instructions and information input via the keyboard 309 and a pointing device (not illustrated). A display controller 306 can control a display to be performed by a display unit 310. A disk controller (DKC) 307 can control every access to the HDD 311 that stores a boot program, various applications, font data, and user files. A network controller (NC) 312 is connected to the network 100 to perform control processing to communicate with other devices connected to the network 100. A bus 304 connects the CPU 301, the RAM 302, the ROM 303, and various controllers to convey data signals and control signals.

The operation unit 204 of the digital printing machine 102 according to the first exemplary embodiment is described in detail below with reference to a plan view illustrated in FIG. 4. The operation unit 204 includes a key input unit 402 that can receive user operations entered via hard keys. A touch panel unit 401 is a display unit that can receive user operations entered via software keys (displayed keys). The touch panel unit 401 can display an operation screen. The controller unit 205 controls the operation unit 204. A display unit of the touch panel unit 401 illustrated in FIG. 4 can display an operation screen under the control of the controller unit 205. Items to be displayed on the display unit or items that can be operated via the display unit are changeable according to a user operation performed on the above-mentioned screen, or a momentary state of the digital printing machine 102. For example, if a user operates the touch panel unit 401, a UI function program described in detail below identifies the operational content input via the touch panel unit 401 and executes processing according to the identified content.

Although the operation unit 204 is constituted by the key input unit 402 and the touch panel unit 401, the configuration of the operation unit 204 can be modified appropriately. For example, the operation unit 204 can be entirely constituted by the touch panel unit 401.

Various programs that can be executed by the digital printing machine 102 are described below.

The programs to be executed by the digital printing machine 102 are stored in the HDD 209 and can be read and executed by the CPU 212 of the controller unit 205 provided in the digital printing machine 102.

A Job Definition Format (JDF) function program is a program that causes the controller unit 205 to realize the print function according to an instruction of the external I/F 202, when the digital printing machine 102 receives a JDF job via the external I/F 202.

A Page Description Language (PDL) function program is a program that causes the controller unit 205 to realize the print function, when the digital printing machine 102 receives PDL data via the external I/F 202.

A User Interface (UI) function program is a control program dedicated to the operation unit 204. The UI function program can identify the content of an instruction input by a user of the digital printing machine 102 via the operation unit 204. The UI function program can perform appropriate screen change processing and can instruct the controller unit 205 to perform requested processing.

A sheet management program is a program that can realize a management function relating to sheets that can be used by the digital printing machine 102. The sheet related information that can be managed by the sheet management program is stored in the HDD 209. In the present exemplary embodiment, the sheet related information managed by the sheet management program is individual data (e.g., sheet size, media type, and remaining amount of sheets) stored for each sheet holding unit. However, the sheet management information is not limited to the above-mentioned examples. For example, the sheet related information managed by the sheet management program can include another data, such as sheet name and sheet grammage.

A job hold function program is a program that can be executed by the controller unit 205 when a user of the digital printing machine 102 instructs executing a job hold function via the operation unit 204. The job hold function can store print target data in the HDD 209 of the digital printing machine 102 until a print instruction is received from the user. Subsequently, the user selects data to be printed. In response to the print instruction, the digital printing machine 102 prints the instructed data. According to the job hold function, the controller unit 205 sequentially instructs each device to perform a predetermined operation according to an appropriate order in such a way as to realize job hold print processing, based on the processing order and processing conditions described by the job hold function program. The devices that can be controlled by the controller unit 205 in this case according to the job hold function include, for example, the printer unit 203, the sheet processing apparatus 200, the HDD 209, the compression/expansion unit 210, and the RAM 208. It is feasible to change settings of each stored job and execute the job according to the changed settings.

When the computer 101 (i.e., an external device) stores a print job in the digital printing machine 102 that has the above-mentioned job hold function, the computer 101 performs the following processing. Specifically, the computer 101 instructs storing the print job according to the job hold function instead of using a PDL function program or a JDF function program to perform job print processing. A printing application that operates on the computer 101 (i.e., a job entry source) designates whether to instruct print processing using the PDL function program or the JDF function program or instruct print job storing processing using the job hold function. The above-mentioned designation is reflected to a setting attribute of a target job to be processed by the PDL function program or the JDF function program. The PDL function program or the JDF function program switches the processing based on the setting attribute.

A media mismatch determination function program is a function that causes the controller unit 205 to perform the following determination processing when a user of the digital printing machine 102 instructs executing the media mismatch determination function via the operation unit 204. The media mismatch determination is determination whether attribute information about a sheet to be used in a print job is not registered to any one of the sheet holding units and whether the remaining amount of the sheets to be used in a print job is zero. The controller unit 205 reads attribute information about a sheet that can be used in the digital printing machine 102, which is stored in the HDD 209 of the digital printing machine 102 by the sheet management program. Then, it is determined whether the attribute information about the sheet to be used in the print job is not registered to any one of the sheet holding units by comparing the read attribute information with attribute information about a sheet to be used in the job held by the job hold function program. Further, the controller unit 205 detects the remaining amount of sheets based on a signal received from the sensor equipped in the sheet holding unit. The controller unit 205 determines whether the remaining amount of the sheets to be used in the print job is zero. A flag that indicates a result of the media mismatch determination performed by the above-mentioned media mismatch determination function program is stored in the RAM 208.

The attribute information about the sheet to be used in the print job includes at least one of a sheet size, a sheet grammage, a sheet surface property, a sheet shape, and a sheet color.

Although the function programs have been partly described in detail, it is unnecessary for the system configuration to have all of the functions. A configuration that includes a part of the function programs or other function programs is employable.

Figure 5A:
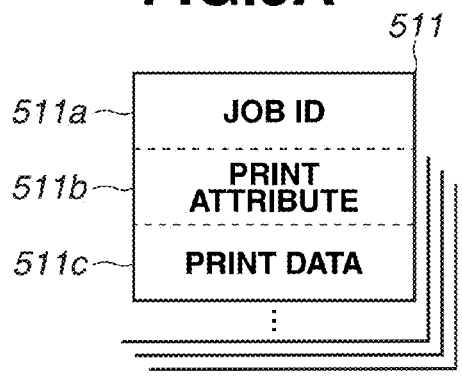
FIG. 5A illustrates a data content of an entry according to the first exemplary embodiment.
Figure 5B:
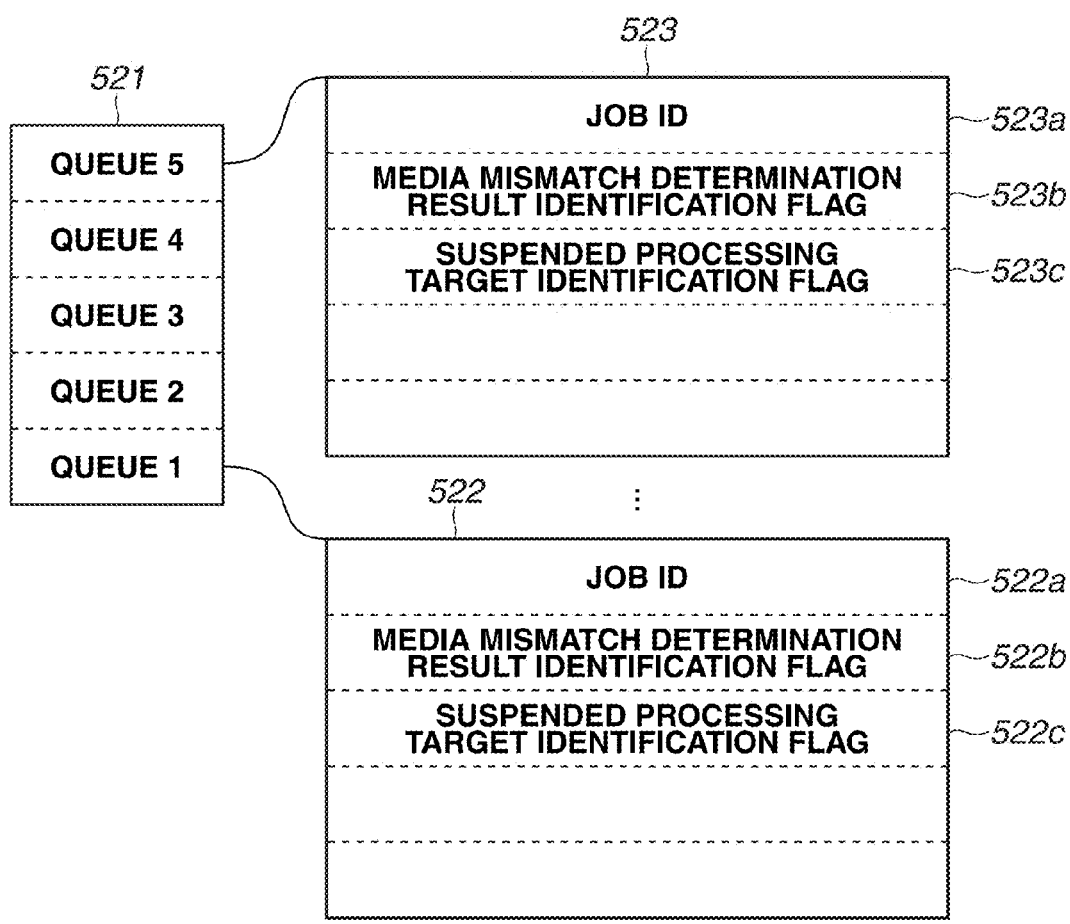
FIG. 5B illustrates an entry related print queue buffer content of an entry according to the first exemplary embodiment.
Figure 5C:
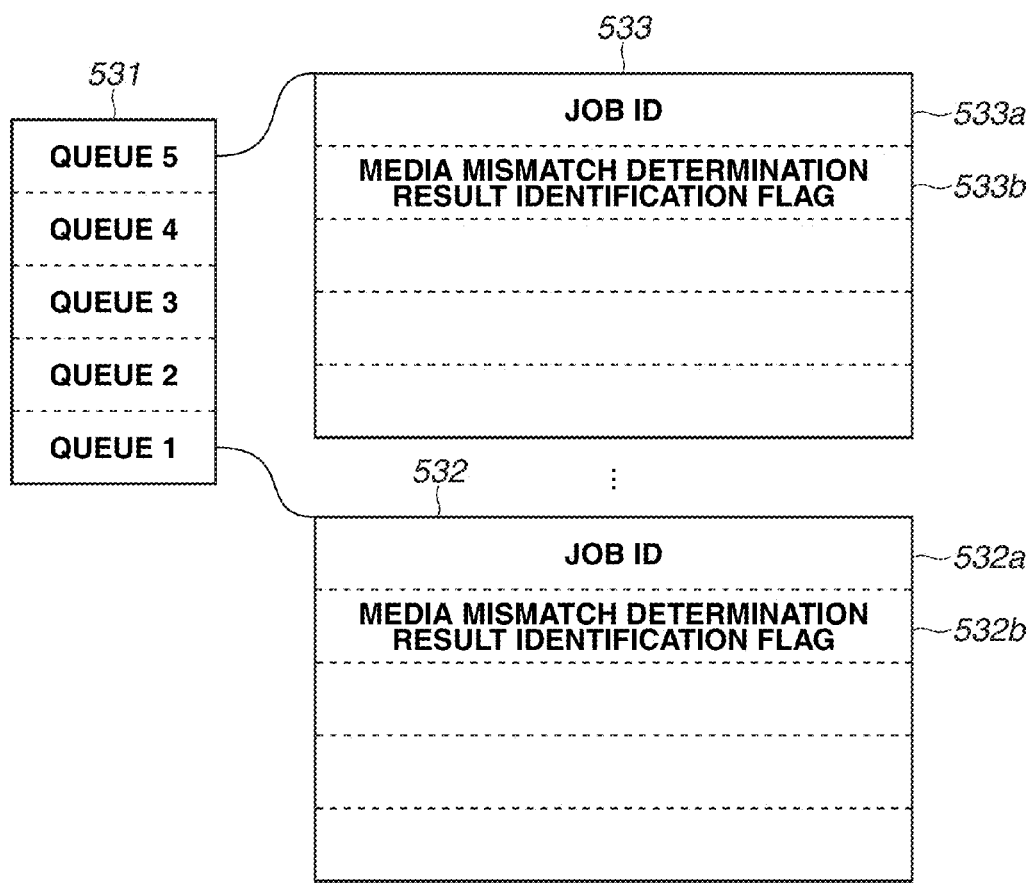
FIG. 5C illustrates a data content of an entry related hold queue buffer according to the first exemplary embodiment.

The data structure of a job, print queue data, and hold queue data of the digital printing machine 102 according to the first exemplary embodiment is described in detail below with reference to FIGS. 5A to 5C.

First, the data structure of a job is described in detail below with reference to FIG. 5A. The job, when it is entered in the digital printing machine 102, has the structure of an entry 511 illustrated in FIG. 5A. The number of entries 511 is equal to the number of jobs that are input and processed by the digital printing machine 102. The entry 511 is constituted by a job ID 511*a*, a print attribute 511*b*, and print data 511*c*. The job ID 511*a* included in the entry 511 is a unique ID, which can be used to identify and specify each job in the digital printing machine 102. The print attribute 511*b* in the entry 511 stores print attribute information defined for the job. For example, the print attribute includes a job entry user name, a sheet size, a media type, and a number of pages. Further, the print data 511*c* included in the entry 511 stores print data that describes an image to be drawn on a printing paper.

Next, the data structure of print queue data is described in detail below with reference to FIG. 5B. When a job is input to the print queue, a print queue buffer 521 manages the input job. If a new job is input in a state where no job is present in the print queue, the input job is registered to a queue 1 of the print queue buffer 521. The next job, if it is input, is registered to a queue 2. The job stacking operation is performed in this manner. The job stacked in the queue 1 is first subjected to print processing and the jobs stacked in the following queues are sequentially subjected to the print processing. If the print processing of a target job completes, the processed job is deleted from the print queue buffer 521. Therefore, the order of each job remaining in the print queue buffer 521 is renumbered. Then, the job being currently stacked in the queue 1 is subjected to the print processing. Although FIG. 5B illustrates only five queues, the number of queues to be provided in the print queue buffer 521 can be set to an appropriate number considering the capability (e.g., memory capacity and print processing speed) of the digital printing machine 102.

A print queue job attribute table is usable to manage the job attribute to be registered to each print queue. For example, as illustrated in FIG. 5B, a print queue job attribute table 522 corresponding to one job is registered to the queue 1 and a print queue job attribute table 523 corresponding to another job is registered to the queue 5. The number of the print queue job attribute tables is equal to the number of queues actually provided in the print queue buffer 521. Hereinafter, the print queue job attribute table 522 is described in detail below.

The print queue job attribute table 522 includes job ID 522a as ID information that can identify each job, flag 522b that can identify a media mismatch determination result, and flag 522c that can identify a suspended processing target.

The media mismatch determination is described in detail below with reference to FIG. 7. The job substance is not present in the above-mentioned print queue job attribute table 522. The following description of the present exemplary embodiment is based on the premise that the job substance is not present in the print queue job attribute table 522. However, the substance of a copied job can be present in the print queue job attribute table 522. The printing system searches a plurality of entries 511 with reference to a value of the above-mentioned job ID 522a to find a job that has the same job ID 522a. Then, the printing system acquires the print attribute 511b and the print data 511c from the corresponding entry 511.

Next, the data structure of hold queue data is described in detail below with reference to FIG. 5C. If a print execution instruction is given for print data managed by a hold queue buffer 531, the print data moves to the print queue buffer 521. If a job is input to a hold queue, the job is managed by the hold queue buffer 531. The hold queue buffer 531 is a storage area of a storage job that can be managed by the job hold function program. The hold queue buffer 531 stores the storage target job, if it is received from an external apparatus, together with print settings. A structure of the hold queue buffer 531 is similar to that of the print queue buffer 521. Therefore, redundant description thereof will be avoided.

A hold queue job attribute table is usable to manage job attribute to be registered to each hold queue. As illustrated in FIG. 5C, a hold queue job attribute table 532 corresponding to one job is registered to the queue 1 and a hold queue job attribute table 533 corresponding to another job is registered to the queue 5. The number of the hold queue job attribute tables is equal to the number of queues actually provided in the hold queue buffer 531. Hereinafter, the hold queue job attribute table 532 is described in detail below.

The hold queue job attribute table 532 includes a job ID 532a as ID information that can identify each job and a flag 532b that can identify a media mismatch determination result. The job substance is not present in the above-mentioned hold queue job attribute table 532. The following description of the present exemplary embodiment is based on the premise that the job substance is not present in the hold queue job attribute table 532. However, the substance of a copied job can be present in the hold queue job attribute table 532. The printing system searches a plurality of entries 511 with reference to a value of the above-mentioned job ID 532a to find a job that has the same job ID 532a. Then, the printing system acquires the print attribute 511b and the print data 511c from the corresponding entry 511.

The printing system performs the following processing to stack a job in the print queue buffer 521 or the hold queue buffer 531 in response to an entry of the job. To attain the above-mentioned processing, the CPU 212 of the controller unit 205 executes the job hold function program that is read out of the ROM 207 or the HDD 209 and loaded into the RAM 208.

First, a user inputs a job to cause the digital printing machine 102 to perform print processing. Then, a queue designation value indicating the storing destination of the job, which is the print queue buffer 521 or the hold queue buffer 531, is registered as job attribute. After the job entered by the user is received, the printing system generates a unique ID and allocates the generated unique ID to the input job. Then, the printing system generates one entry 511 for each job. The printing system inputs the generated job ID to the job ID 511a field of the entry 511. The printing system inputs the print attribute of the received job to the print attribute 511b field of the entry 511. The printing system inputs the received print data to the print data 511c field of the entry 511.

Next, the above-mentioned queue designation value is read. If the queue designation value is a print queue, the input job is stacked in a queue of the print queue buffer 521. On the other hand, if the queue designation value is a hold queue, the input job is stacked in a queue of the hold queue buffer 531.

When the input job is stacked in a queue of the print queue buffer 521, the printing system generates one print queue job attribute table 522 (see FIG. 5B) for the input job. Then, the printing system registers the job ID to the job ID 522a field of the print queue job attribute table 522.

On the other hand, when the input job is stacked in a queue of the hold queue buffer 531, the printing system generates one hold queue job attribute table 532 (see FIG. 5C) for the input job. Then, the printing system registers the job ID to the job ID 532a field of the hold queue job attribute table 532.

An operation that can be performed by the printing system having the above-mentioned configuration according to the present exemplary embodiment is described below.

The printing system starts media mismatch determination processing in a state where a screen illustrated in FIG. 14A is displayed on a display unit of the operation unit 204.

An example of the job hold function operation screen that can be displayed on the operation unit 204 of the digital printing machine 102 according to the first exemplary embodiment is described in detail below with reference to FIG. 14A. The job hold function operation screen includes a plurality of display areas and a plurality of operation buttons. Hereinafter, important features in describing the first exemplary embodiment are described in detail below.

The job hold function is a function of storing print target data in the HDD 209 of the digital printing machine 102 until a user inputs a print instruction, and subsequently of performing printing based on data corresponding to the print instruction received from the user. The job hold function enables the digital printing machine 102 to store a plurality of print job data in the HDD 209. As mentioned above, the job hold function allows each user to select an intended print job from a plurality of print jobs stored in the HDD 209 and to designate the execution order. Therefore, it is feasible to perform printing regardless of the order stored in the HDD 209.

A hold job list 1402 is an area provided to display a list of print jobs stored in the above-mentioned hold queue buffer 531, in the digital printing machine 102. According to the example illustrated in FIG. 14A, six print jobs are displayed. However, the digital printing machine 102 can store many print jobs in the HDD 209 although the number of print jobs that can be simultaneously displayed on the hold job list 1402 is limited. For example, when the number of print jobs stored in the HDD 209 is seven or more, a user can touch or press a scroll button 1408 or 1409 to sequentially display all of the stored print jobs on the hold job list 1402. The hold job list 1402 includes a plurality of fields of job name 1404, user name 1405, and date/time 1406 to express each print job. The information stored in the date/time 1406 field indicates storage date and time of the print job stored in the digital printing machine 102.

A user who operates the above-mentioned job hold screen can identify a user's own job by checking the user name (i.e., operator name) 1405 and can select a target print job.

If a user presses or touches the hold job list 1402 with a finger to point a print job portion displayed thereon, the pointed print job turns into selected state. More specifically, the pointed print job is designated as a print target.

A screen illustrated in FIG. 14B is an example that can be displayed immediately after an operator A operates the job hold function operation screen displayed on the operation unit 204 to select a print job. According to the example illustrated in FIG. 14B, the operator A successively selects Job A, Job D, and Job E and therefore each of three jobs is in selected state. More specifically, each of selection marks (1421, 1422, and 1423) indicates the selected state of a corresponding job if it is displayed on the left side of the job name field. Further, a numerical value indicating the selection order is suffixed to each selection mark. Further, a lastly selected Job E 1424 is displayed reversely to indicate that the Job E is currently selected on the hold job list 1402.

A print job list 1403 is an area provided to display print jobs that the digital printing machine 102 has already started their print processing or print jobs that are in a standby state before the digital printing machine 102 starts their print processing. Further, the print job list 1403 is an area provided to display a list of print jobs stored in the above-mentioned print queue buffer 521. A waiting time 1414 indicates an approximate waiting time required to start the print processing for a print job stored in the print queue buffer 521.

According to the example illustrated in FIG. 14B, a print job being currently in print processing state is a Job X (status: printing). On the other hand, a print job being in print processing standby state is a Job Y (status: waiting).

A details button 1411 is a button that is operable to display a screen that enables a user to confirm details about a print job being in selected state on the hold job list 1402.

According to the example illustrated in FIG. 14B, if the details button 1411 is pressed in a state where the Job E is lastly selected, detailed information about the Job E can be confirmed.

A print start button 1412 is a button that is operable to instruct to start print processing of a print job selected on the hold job list 1402. If the print start button 1412 is pressed in a state where a target print job is selected from a plurality of print jobs displayed on the hold job list 1402, the selected print job is displayed on the print job list 1403 and brought into print processing standby state. A stop button 1413 is a button that is operable to stop the execution of the print job being in the state where the print processing has been started by the print start button 1412.

A media mismatch determination button 1407 is a button that is operable to perform media mismatch determination processing on a print job selected from the hold job list 1402. The media mismatch determination button 1407 can be brought into a gray-out state (i.e., a non-selectable state) if there is not any print job selected on the hold job list 1402. According to the example illustrated in FIG. 14B, the printing system performs the media mismatch determination processing for each job being selected state (i.e., Job A, Job D, and Job E).

Hereinafter, sequential processing relating to the media mismatch determination according to the first exemplary embodiment, which can be performed for a job stacked in the hold queue buffer 531, is described in detail below with reference to a flowchart illustrated in FIG. 6. To attain the above-mentioned processing, the CPU 212 of the controller unit 205 executes the UI function program that is read out of the ROM 207 or the HDD 209 and loaded into the RAM 208. The CPU 212 starts the processing of the flowchart illustrated in FIG. 6 in a state where the hold job list 1402 is displayed on the operation unit 204 and a target job is already selected from jobs stacked in the hold queue buffer 531.

In step S601, the CPU 212 waits for an operation that may be performed by a user on the screen illustrated in FIG. 14A, which can be displayed on the operation unit 204. The CPU 212 repeats the processing in step S601 until any operation is performed by the user. If a user operation on the operation unit 204 is detected (YES in step S601), the operation proceeds to step S602.

In step S602, the CPU 212 determines whether the user has pressed the media mismatch determination button 1407. If it is determined that the media mismatch determination button 1407 has been pressed (YES in step S602), the operation proceeds to step S700. In this case, it is useful to bring the media mismatch determination button 1407 into a gray-out state if no print job is selected, so that the user cannot press the media mismatch determination button 1407. Further, in a case where the CPU 212 performs the media mismatch determination processing only for the selected print job, it is useful that the operation does not proceed to step S700 even when the media mismatch determination button 1407 is pressed if there is not any selected print job. On the other hand, it is useful that the CPU 212 performs the media mismatch determination processing for all jobs stacked in the hold queue buffer 531 in response to the pressing of the media mismatch determination button 1407.

In step S700, the CPU 212 performs media mismatch determination processing. The media mismatch determination processing to be performed in step S700 is described in detail below with reference to FIG. 7.

After the CPU 212 completes the media mismatch determination processing in step S700, the operation proceeds to step S1000. In step S1000, the CPU 212 performs media mismatch determination result notification processing. The media mismatch determination result notification processing to be performed in step S1000 is described in detail below with reference to FIG. 10.

If the CPU 212 completes the execution of the media mismatch determination result notification processing in step S1000, the operation returns to step S601.

On the other hand, if it is determined that the media mismatch determination button 1407 has not been pressed (NO in step S602), the operation proceeds to step S603.

In step S603, the CPU 212 determines whether the user has pressed a sheet setting button 1410 illustrated in FIG. 14B. In a state where no job is selected, the sheet setting button 1410 is brought into a gray-out state and therefore the user cannot press the sheet setting button 1410. Further, in a case where no media mismatch (sheet type inconsistency) occurs in a job, it is useful that the sheet setting button 1410 is brought into a gray-out state even if there is a selected job, to prevent the sheet setting button 1410 from being pressed. More specifically, if the sheet type inconsistent state does not occur even when the remaining amount zero state occurs in the job, it is useful that the sheet setting button 1410 is brought into a gray-out state to prevent the sheet setting button 1410 from being pressed.

If it is determined that the sheet setting button 1410 has been pressed (YES in step S603), the operation proceeds to step S1100. In this case, it is useful that the operation does not proceed to step S1100 even when the sheet setting button 1410 is pressed if there is not any selected print job.

In step S1100, the CPU 212 performs processing relating to settings of a sheet to be used in the selected job. The sheet setting processing to be performed in step S1100 is described in detail below with reference to FIG. 11. If the CPU 212 completes the execution of the sheet setting processing in step S1100, the operation returns to step S601. Alternatively, it is useful that the operation proceeds to step S700 after the CPU 212 completes the sheet setting processing in step S1100, instead of returning to step S601, in such a way as to perform the media mismatch determination processing by replacing the sheet to be used in the job by the sheet having been set in step S1100.

On the other hand, If it is determined that the sheet setting button 1410 has not been pressed (NO in step S603), the operation proceeds to step S604. In step S604, the CPU 212 determines whether the user has pressed the print start button 1412.

If it is determined that the print start button 1412 has been pressed (YES in step S604), the operation proceeds to step S605. In a state where no job is selected, the print start button 1412 is brought into a gray-out state and therefore the user cannot press the print start button 1412.

In step S605, the CPU 212 registers the job selected from the hold job list 1402 illustrated in FIG. 14B and instructed to perform print processing, to the print queue buffer 521. In this case, the job registered to the print queue buffer 521 can be displayed on the print job list 1403 illustrated in FIG. 14B and brought into print processing standby state. After the CPU 212 completes the job registration to the print queue buffer 521 (i.e., the processing in step S605), the operation returns to step S601.

On the other hand, If it is determined that the print start button 1412 has not been pressed (NO in step S604), the operation proceeds to step S606. In step S606, the CPU 212 performs processing other than the media mismatch determination processing, if it is instructed by a user operation.

For example, the processing to be performed in step S606 includes selecting a job that has been once subjected to the media mismatch determination processing and pressing the details button 1411 illustrated in FIG. 14B to display a screen that calls details of a job being in selected state.

Figure 6:
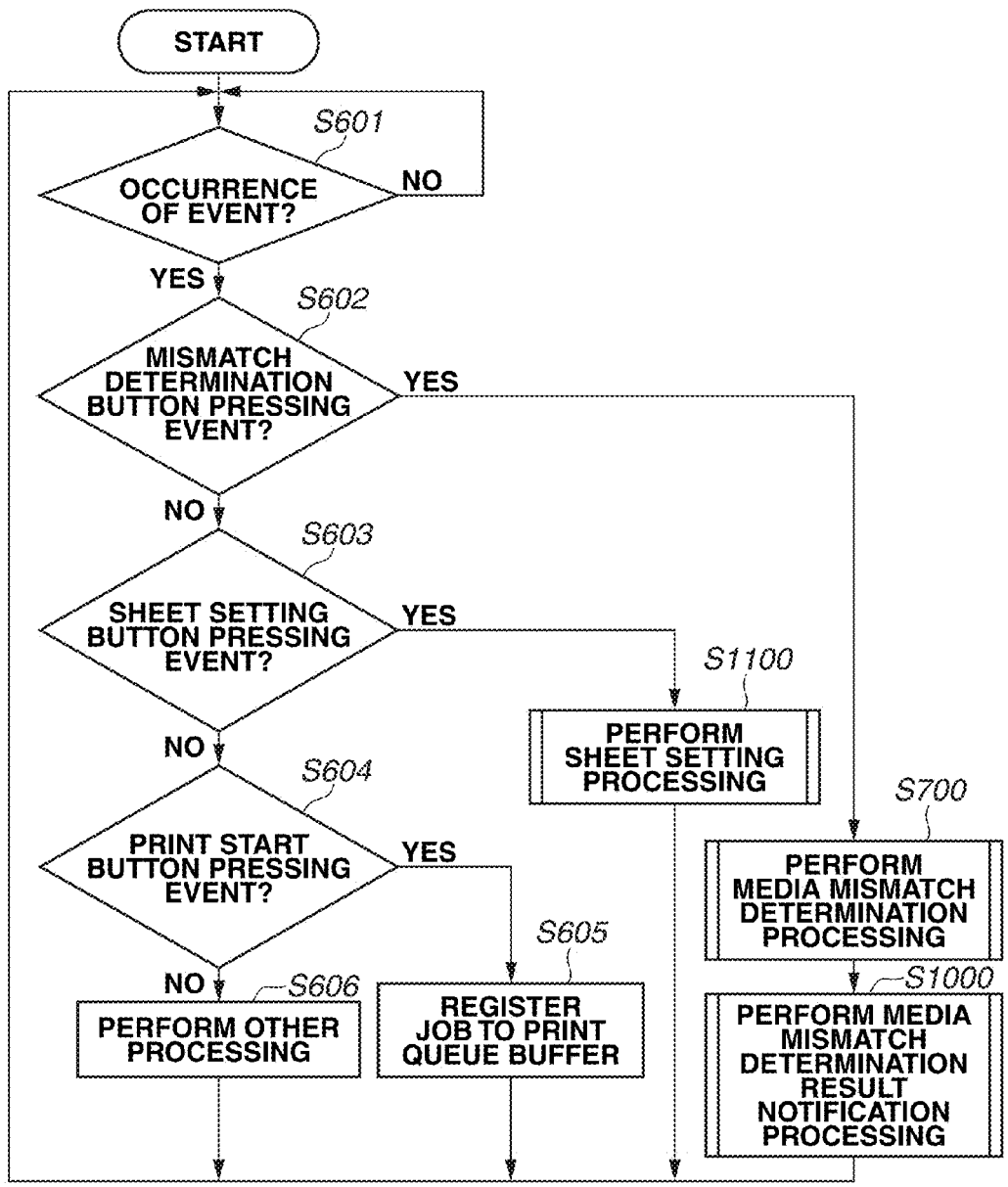
FIG. 6 is a flowchart illustrating sequential processing relating to media mismatch determination, which can be performed by the digital printing machine according to the first exemplary embodiment.
Figure 7:
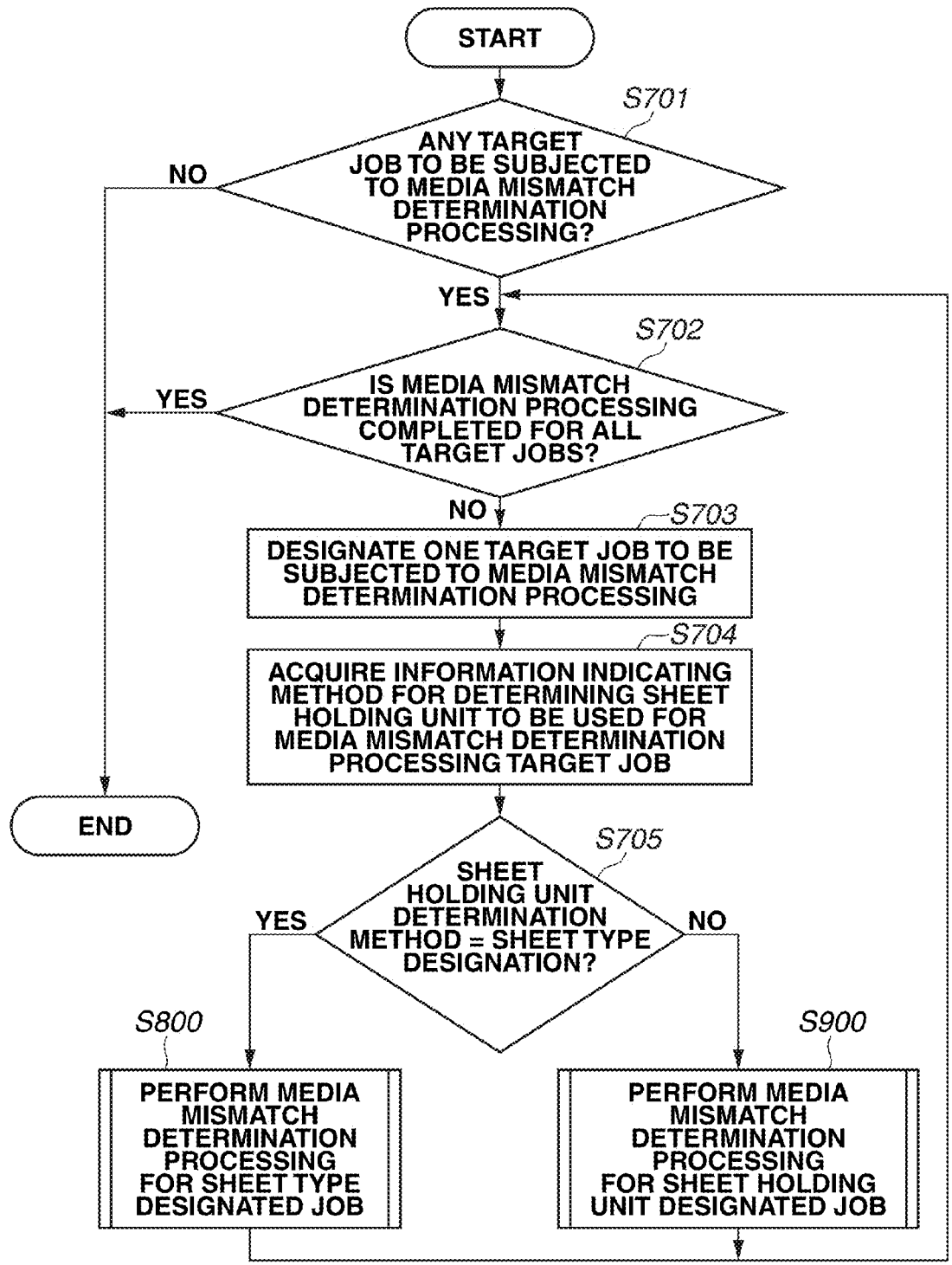
FIG. 7 is a flowchart illustrating media mismatch determination processing (see step S700) illustrated in FIG. 6, which can be performed by the digital printing machine according to the first exemplary embodiment.

FIG. 7 is a flowchart illustrating details of the media mismatch determination processing to be performed in step S700 (see FIG. 6) according to the first exemplary embodiment. To attain the processing illustrated in FIG. 7, the CPU 212 of the controller unit 205 executes the media mismatch determination function program that is read out of the ROM 207 or the HDD 209 and loaded into the RAM 208. The media mismatch determination processing to be performed in step S700 according to the first exemplary embodiment can be started when the media mismatch determination button 1407 is pressed. Further, if the media mismatch determination button 1407 is pressed again, the CPU 212 performs the media mismatch determination processing again. The determination result can be updated.

In the first exemplary embodiment, the CPU 212 performs the following processing for a target print job that the user has selected from the print jobs displayed on the hold job list 1402. The target print job is not limited to the one having been selected by the user. The target in the above-mentioned processing can be each of the print jobs stacked in the hold queue buffer 531.

First, in step S701, the CPU 212 determines whether the number of target print jobs to be subjected to the media mismatch determination processing is equal to or greater than 1. If the determination result in step S701 indicates that the number of target print jobs to be subjected to the media mismatch determination is equal to or greater than 1 (YES in step S701), the operation proceeds to step S702. On the other hand, if the determination result in step S701 indicates that the number of target print jobs to be subjected to the media mismatch determination is smaller than 1 (NO in step S701), the CPU 212 terminates the media mismatch determination related processing (i.e., the processing in step S700) illustrated in FIG. 7. The operation proceeds to step S1000 illustrated in FIG. 6.

Then, in step S702, the CPU 212 determines whether the media mismatch determination processing has been completed for all print jobs to be subjected to the media mismatch determination processing. If it is determined that the media mismatch determination processing is not yet completed for all target print jobs to be subjected to the media mismatch determination processing (NO in step S702), the operation proceeds to step S703. On the other hand, if it is determined that the media mismatch determination processing has been completed for all target print jobs to be subjected to the media mismatch determination processing (YES in step S702), the CPU 212 terminates the media mismatch determination related processing (i.e., the processing in step S700). The operation proceeds to step S1000 illustrated in FIG. 6.

In step S703, the CPU 212 designates one target print job to be subjected to the media mismatch determination processing. Then, the operation proceeds to step S704. In step S704, the CPU 212 acquires information indicating a determination method (i.e., sheet type designation or sheet holding unit designation) for determining a sheet holding unit to be used in the print job that has been determined as a target to be subjected to the media mismatch determination processing in step S703. Then, the operation proceeds to step S705.

In step S705, the CPU 212 determines whether the method for determining the sheet holding unit to be used in the print job is "sheet type designation" or "sheet holding unit designation". If the print job is a sheet type designation (YES in step S705), the CPU 212 instructs the media management unit 211 to refer to a sheet management table illustrated in FIG. 17A.

An example of the sheet management table that manages information about sheets stored in each sheet holding unit of the digital printing machine 102 is described in detail below with reference to FIG. 17A. The sheet management table is stored in the HDD 209 and can be referred to by the CPU 212. The example of the sheet management table illustrated in FIG. 17A includes sheet holding unit ID 1711 that serves as a key to manage information about size 1712, media type 1713, and remaining amount 1714 for each of ten sheet holding units provided in the digital printing machine 102. The remaining amount of sheets can be detected by the sensor equipped in each sheet holding unit.

For example, a record 1701 indicates that the sheet stored in a sheet holding unit (ID=1) is A4 in the sheet size, plain paper 1 in the media type, and 3 in the remaining amount. Numerical values indicated by the above-mentioned remaining amount 1714 have the following meanings with respect to the remaining amount; 3: full (100%), 2: small (25%), 1: extremely small (less than 5%), 0: zero (0%), respectively. The accuracy in the above-mentioned sheet remaining amount detection can be increased by improving the performance of the remaining amount sensor. However, the digital printing machine 102 according to the first exemplary embodiment performs the remaining amount detection with reference to the numerical values indicated by the above-mentioned remaining amount. For example, if the storage capacity of a sheet holding unit is 3000 sheets, the remaining amount=full (100%) means that the number of sheets remaining in the sheet holding unit is 3000. The remaining amount=small (25%) means that 750 sheets remain in the sheet holding unit having the storage capacity of 3000 sheets. The remaining amount=extremely small (less than 5%) means that the number of sheets remaining in the sheet holding unit having the storage capacity of 3000 sheets is less than 150. The remaining amount zero (0%) means that there is not any sheet remaining in the sheet holding unit having the storage capacity of 3000 sheets. As mentioned above, it is feasible to detect the remaining amount of sheets stored in each sheet holding unit, at three stages, using the sensor provided in each sheet holding unit.

For example, when the print job uses an A4 colored paper (red), the CPU 212 determines whether the A4 colored paper (red) is registered to any one of the sheet holding units, with reference to the sheet management table illustrated in FIG. 17A. Then, based on a determination result that the sheet size stored in a sheet holding unit (ID=2) is A4 and the media type is colored paper (red), the CPU 212 determines that the sheet holding destination is the sheet holding unit (ID=2). On the other hand, when the print job designates a sheet holding unit (ID=3), the sheet management table illustrated in FIG. 17A is referred to and the "A3 plain paper 1" stored in the sheet holding unit (ID=3) is supplied.

If the determination result in step S705 indicates that the target print job is a sheet type designated job (YES in step S705), the operation proceeds to step S800. On the other hand, if it is determined that the target print job is a sheet holding unit designated job (NO in step S705), the operation proceeds to step S900. The processing to be performed in step S800 and the processing to be performed in step S900 are described in detail below with reference to FIGS. 8 and 9. If the CPU 212 completes the processing in step S800 or step S900, the operation returns to step S702.

Figure 8:
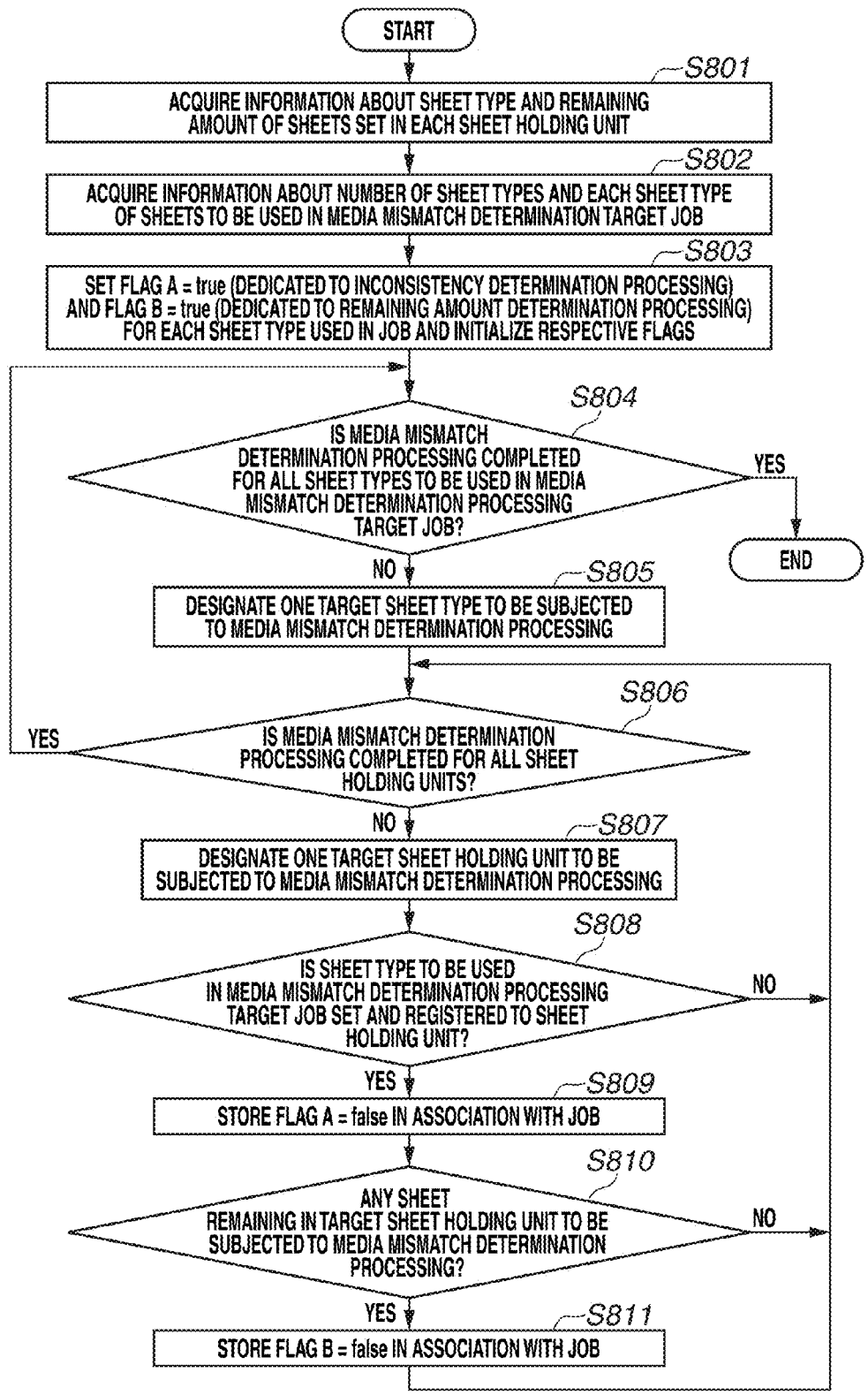
FIG. 8 is a flowchart illustrating media mismatch determination processing (see step S800) illustrated in FIG. 7, which can be performed by the digital printing machine according to the first exemplary embodiment when the target print job is a sheet type designated job.

FIG. 8 is a flowchart illustrating the media mismatch determination processing to be performed in step S800 illustrated in FIG. 7 when the target print job to be subjected to the media mismatch determination processing is a sheet type designated job. To attain the processing illustrated in FIG. 8, the CPU 212 of the controller unit 205 executes the media mismatch determination function program that can be read out of the ROM 207 or the HDD 209 and loaded into the RAM 208.

In step S801, the CPU 212 acquires information about the sheet type and the remaining amount of sheets set in each sheet holding unit provided in the digital printing machine 102. The CPU 212 instructs the media management unit 211 to perform the processing in step S801, for example, with reference to the above-mentioned sheet management table illustrated in FIG. 17A. Then, the operation proceeds to step S802. In step S802, the CPU 212 reads a print job stored in the hold queue buffer 531, with reference to the target print job to be subjected to the media mismatch determination processing. Then, the CPU 212 acquires the number of sheet types being sheet type designated, of sheet types to be used in the print jobs illustrated in FIG. 17B.

FIG. 17B illustrates information about sheets to be used in Job A, Job D, and Job E illustrated in FIG. 14B. The information illustrated in FIG. 17B can be stored when the job hold function program stores a print job in the hold queue buffer 531 because print settings can be simultaneously stored. The print settings include sheet information about each print job. FIG. 17B indicates that the Job A uses two types of sheets, in which one sheet is A4 in the sheet size and "plain paper 1" in the media type and the other sheet is A4 in the sheet size and "two-sided coated paper 1" in the media type. Further, FIG. 17B indicates that the Job D uses two types of sheets, in which one sheet is LTR in the sheet size and "plain paper 1" in the media type and the other sheet is 11×17 in the sheet size and "plain paper 1" in the media type. Similarly, FIG. 17B indicates that the Job E uses three types of sheets, in which the first sheet is A4 in the sheet size and "plain paper 1" in the media type, the second sheet is A4 in the sheet size and "colored paper (red)" in the media type, and the third sheet is A3 in the sheet size and "two-sided coated paper 2" in the media type. Each combination of the sheet size and the media type defines a sheet type.

Next, the operation proceeds to step S803. The CPU 212 sets two types of flags (i.e., Flag A and Flag B) each holding a result in the media mismatch determination processing, for each sheet type acquired in step S802, and performs initialization processing for respective flags. In this case, the Flag A is a flag that holds a determination result as to whether attribute information about a sheet to be used in the print job is not registered to any one of the sheet holding units. The Flag A is stored in the RAM 208. On the other hand, the Flag B is a flag that holds a determination result as to whether the remaining amount of sheets to be used in the print job is zero. The Flag B is stored in the RAM 208. The Flag A having a "true" value indicates a media mismatch (i.e., sheet type inconsistent) state. More specifically, when the Flag A is "true", it means that a sheet type designated by the print job is not set in any one of the sheet holding units. On the other hand, the Flag B having a "true" value indicates a media mismatch (sheet remaining amount zero) state. More specifically, when the Flag B is "true", it means that the remaining amount of sheets having a sheet type to be used in a print job is zero. In the initialization processing, the Flag A is initialized to have a value of true (mismatch) and the Flag B is initialized to have a value of true (remaining amount zero).

Next, the operation proceeds to step S804. The CPU 212 determines whether the above-mentioned media mismatch determination processing has been completed for all sheet types of the target print job to be subjected to the media mismatch determination processing. If the media mismatch determination processing is not yet completed for all sheet types (NO in step S804), the operation proceeds to step S805. In step S805, the CPU 212 selects one target sheet type to be subjected to the media mismatch determination processing in the print job. Then, the operation proceeds to step S806.

In step S806, the CPU 212 determines whether the media mismatch determination processing has been completed for all sheet holding units provided in the digital printing machine 102. If it is determined that there is at least one sheet holding unit that is not yet subjected to the media mismatch determination processing (NO in step S806), the operation proceeds to step S807. In step S807, the CPU 212 designates a target sheet holding unit to be next subjected to the media mismatch determination. Then, the operation proceeds to step S808.

In step S808, the CPU 212 determines whether the target sheet type to be subjected to the media mismatch determination processing determined in step S805 coincides with a sheet type being set and registered to the target sheet holding unit to be subjected to the media mismatch determination processing determined in step S807. If it is determined that the compared sheet types coincide with each other (YES in step S808), the operation proceeds to step S809. On the other hand, if it is determined that the compared sheet types does not coincide with each other (NO in step S808), the operation returns to step S806 to repeat the processing in step S806 and subsequent steps.

In step S809, the CPU 212 stores the value of Flag A as being "false (match)" indicating that the print job designates the sheet type registered to the sheet holding unit, in association with the print job. Then, the operation proceeds to step S810. The CPU 212 determines whether the remaining amount of sheets in the target sheet holding unit to be subjected to the media mismatch determination processing determined in step S807 is not zero. If it is determined that the remaining amount of sheets is not zero (YES in step S810), the operation proceeds to step S811. In step S811, the CPU 212 stores the value of Flag B as being "false (remaining amount is not zero)" indicating that the remaining amount of sheets having the sheet type to be used in the print job is not zero, in association with the print job. Then, the operation returns to step S806 to repeat the processing in step S806 and subsequent steps. On the other hand, if t it is determined that the remaining amount of sheets is zero (NO in step S810), the operation returns to step S806 to repeat the processing in step S806 and subsequent steps.

If the determination result in step S806 indicates that the media mismatch determination processing has been completed for all sheet holding units (YES in step S806), the operation returns to step S804 to repeat the processing in step S804 and subsequent steps. Further, if the determination result in step S804 indicates that the media mismatch determination has been completed for all sheet types of the target print job to be subjected to the media mismatch determination processing, the CPU 212 terminates the media mismatch determination processing (i.e., the processing to be performed in step S800 when the target print job is a sheet type designated job). Subsequently, the operation returns to step S702 illustrated in FIG. 7. As mentioned above, the CPU 212 performs the media mismatch determination processing in step S800 illustrated in FIG. 7 if the target print job is a sheet type designated job.

Figure 9:
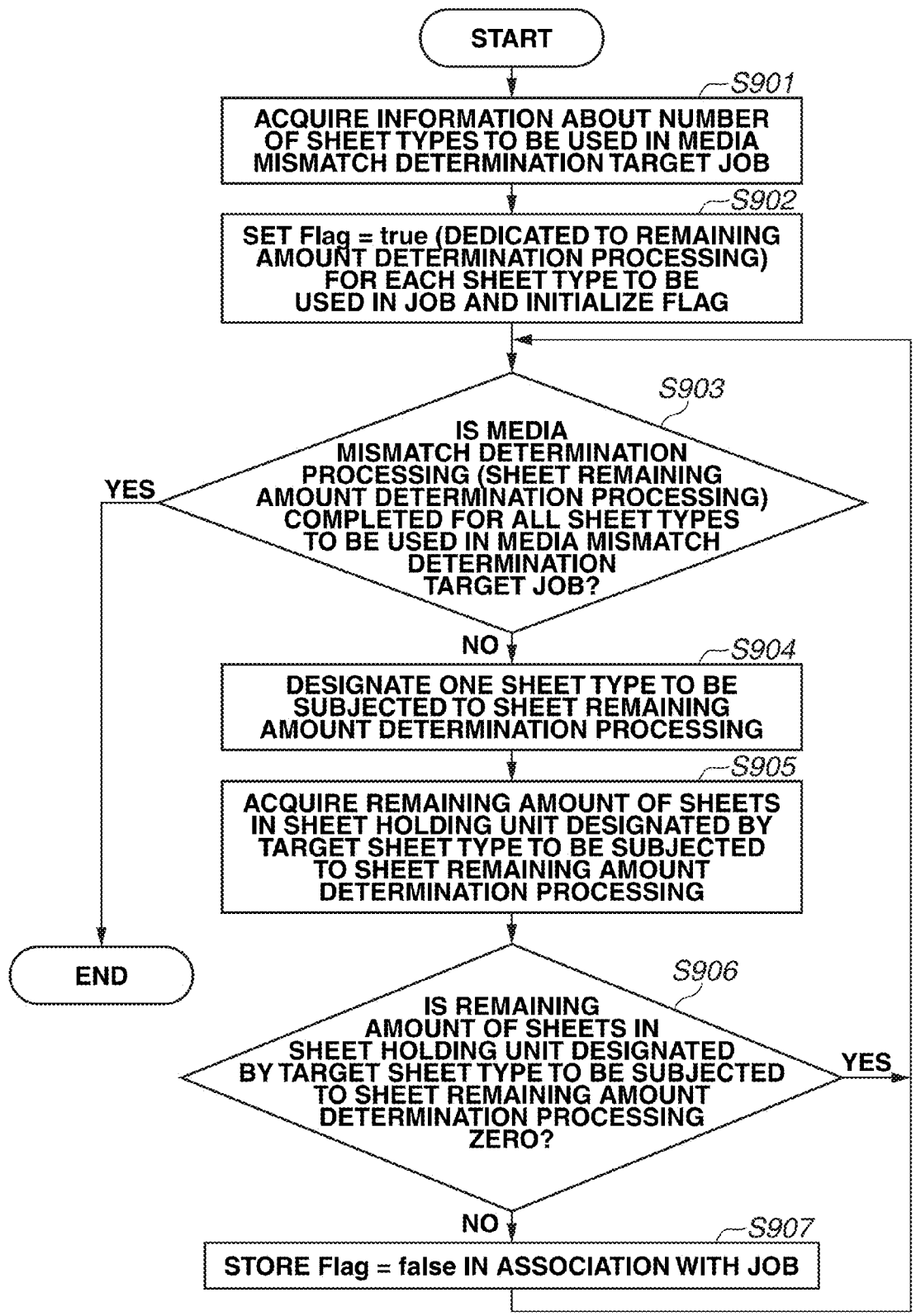
FIG. 9 is a flowchart illustrating media mismatch determination processing (see step S900) illustrated in FIG. 7, which can be performed by the digital printing machine according to the first exemplary embodiment when the target print job is a sheet holding unit designated job.

On the other hand, if the determination result in step S705 illustrated in FIG. 7 indicates that the target print job is a sheet holding unit designated job (NO in step S705), the operation proceeds to step S900. FIG. 9 is a flowchart illustrating the media mismatch determination processing that can be performed by the CPU 212 in step S900 illustrated in FIG. 7 when the target print job to be subjected to the media mismatch determination processing is the sheet holding unit designated job. To attain the processing illustrated in FIG. 9, the CPU 212 of the controller unit 205 executes the media mismatch determination function program that is read out of the ROM 207 or the HDD 209 and loaded into the RAM 208.

In step S901, the CPU 212 acquires the number of sheet types whose sheet holding units are designated and used in the print job, as information about sheets used in the print jobs illustrated in FIG. 17B, with respect to the target print job to be subjected to the media mismatch determination processing. Next, the operation proceeds to step S902. The CPU 212 sets a flag (Flag) that holds a result of the media mismatch determination (i.e., sheet remaining amount determination) processing for each sheet type acquired in step S901 and performs initialization processing for the flag being set.

The Flag being set in step S902 is a flag that holds a determination result as to whether the remaining amount of sheets to be used in the print job is not zero. The value of Flag is stored in the RAM 208. The Flag having a value "true (remaining amount is zero)" indicates a media mismatch state. More specifically, when the Flag is "true (remaining amount is zero)", it means that the remaining amount of sheets having a sheet type to be used in the print job is zero. In the initialization processing, the Flag is initialized to have the value "true (remaining amount is zero)". However, when the target print job is a sheet holding unit designated job, the CPU 212 does not determine whether a sheet to be used in the job is registered to a sheet holding unit designated by the job. Therefore, a sheet type inconsistency determination flag is not used.

Next, the operation proceeds to step S903. The CPU 212 determines whether the above-mentioned media mismatch determination (i.e., sheet remaining amount determination) processing has been completed for all sheet types of a target print job to be subjected to the media mismatch determination (i.e., sheet remaining amount determination) processing. If it is determined that the media mismatch determination processing is not yet completed for all sheet types (NO in step S903), the operation proceeds to step S904. In step S904, the CPU 212 selects one target sheet type to be subjected to the media mismatch determination (sheet remaining amount determination) in the print job. Then, the operation proceeds to step S905. In step S905, the CPU 212 acquires information about the remaining amount of sheets in the sheet holding unit designated by the target sheet type to be subjected to the sheet remaining amount determination processing, which has been determined in step S904, and used in the print job. The CPU 212 instructs the media management unit 211 to perform the above-mentioned processing in step S905, for example, with reference to the sheet management table illustrated in FIG. 17A.

The operation proceeds to step S906. The CPU 212 determines whether the remaining amount of sheets in the sheet holding unit acquired in step S905 is zero. If it is determined that the remaining amount of sheets is not zero (NO in step S906), the operation proceeds to step S907. In step S907, the CPU 212 stores the value of Flag as being "false (remaining amount is not zero)" indicating that the remaining amount of sheets to be used in the print job is not zero, in association with the print job. Then, the operation returns to step S903 to repeat the processing in step S903 and subsequent steps.

On the other hand, if it is determined that the remaining amount of sheets is zero (YES in step S906), the operation returns to step S903 to repeat the processing in step S903 and subsequent steps.

Further, if the determination result in step S903 indicates that the media mismatch determination has been completed for all sheet types of the target print job to be subjected to the media mismatch determination processing (YES in step S903), the CPU 212 terminates the media mismatch determination processing (i.e., the processing to be performed in step S900 when the target print job is a sheet holding unit designated job). Subsequently, the operation returns to step S702 illustrated in FIG. 7.

As mentioned above, the CPU 212 performs the media mismatch determination processing in step S900 illustrated in FIG. 7 if the target print job is a sheet holding unit designated job.

Figure 10:
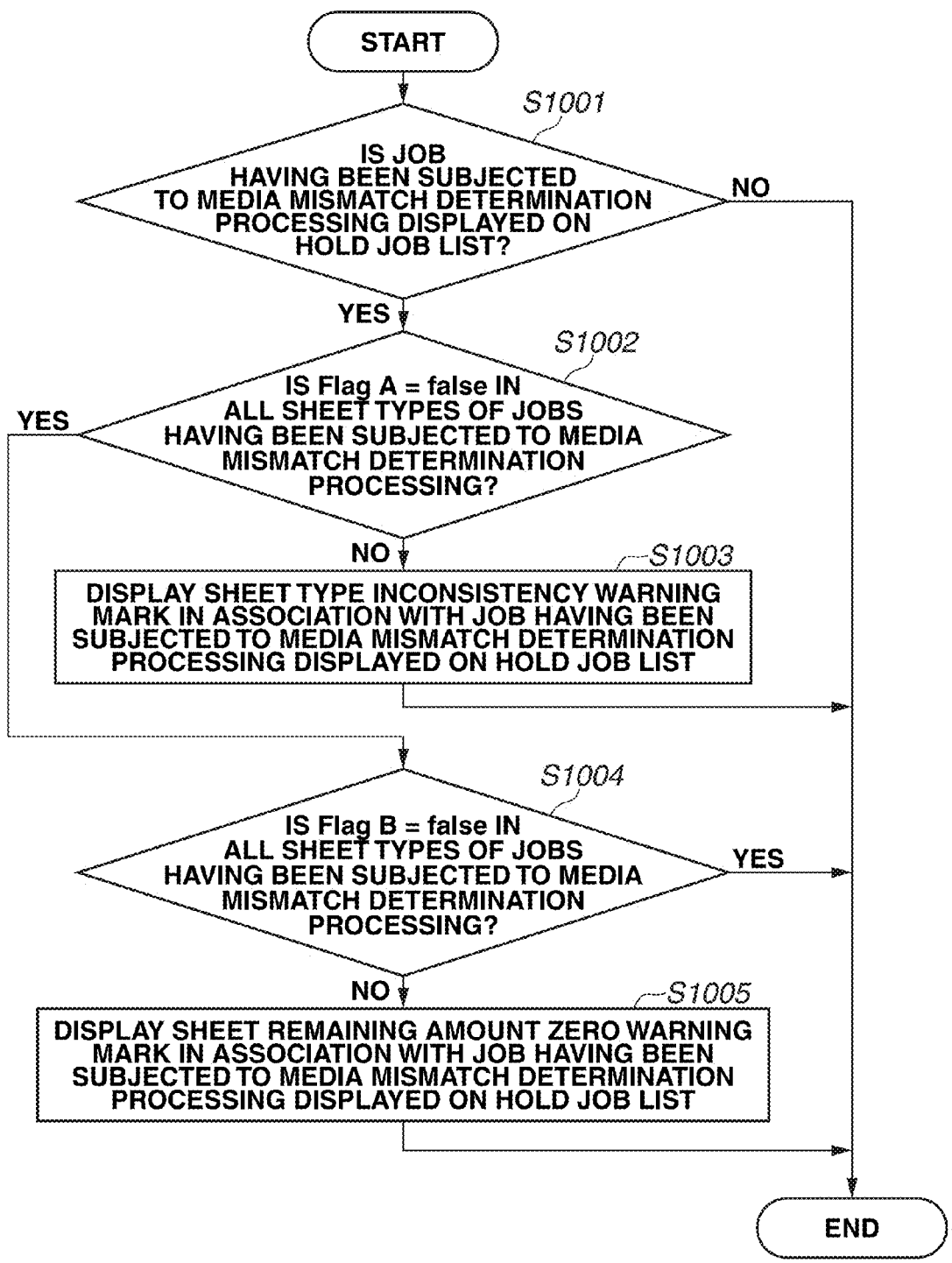
FIG. 10 is a flowchart illustrating media mismatch determination result notification processing (see step S1000) illustrated in FIG. 6, which can be performed by the digital printing machine according to the first exemplary embodiment.

FIG. 10 is a flowchart illustrating the processing to be performed in step S1000 (i.e., the processing to notify a media mismatch determination result to the hold job list 1402). To attain the processing illustrated in FIG. 10, the CPU 212 of the controller unit 205 executes the UI function program that is read out of the ROM 207 or the HDD 209 and loaded into the RAM 208.

In step S1001, the CPU 212 determines whether the print job having been subjected to the media mismatch determination processing is currently displayed on the hold job list 1402. If it is determined that the print job having been subjected to the media mismatch determination processing is currently displayed on the hold job list 1402 (YES in step S1001), the operation proceeds to step S1002.

In step S1002, the CPU 212 reads the value of Flag A, which is the sheet type inconsistency flag that holds a determination result as to whether attribute information about sheets to be used in the print job having been subjected to the media mismatch determination processing is not registered to any one of the sheet holding units, from the RAM 208. Then, the CPU 212 determines whether the value of Flag A is "false (match)".

If it is determined that the value of Flag A is true (mismatch) in at least one sheet type, it indicates a media mismatch (sheet type inconsistent) state. More specifically, when the Flag A is true (mismatch), it means that a sheet type designated by the print job is not set in any one of the sheet holding units. Accordingly, in this case (NO in step S1002), the operation proceeds to step S1003. For example, as illustrated in FIG. 14C, the CPU 212 displays an inconsistency mark 1431 indicating the media mismatch state in the entry of a print job on the hold job list 1402 in association with the print job. The inconsistency mark 1431 indicates that the sheet having the sheet type (e.g., size and media type) to be used in the print job is not set in any one of the sheet holding units. Then, the CPU 212 terminates the sequential media mismatch determination result notification processing (i.e., the processing in step S1000). Then, the operation returns to step S601 illustrated in FIG. 6.

On the other hand, if it is determined that the value of Flag A is false in all types of jobs having been subjected to media mismatch determination processing (YES in step S1002), the operation proceeds to step S1004. In step S1004, the CPU 212 reads the value of Flag B from the RAM 208 and determines whether the value of Flag B is "false (remaining amount is not zero)". The Flag B is a flag that holds a sheet remaining amount determination result as to whether the remaining amount of sheets to be used in the print job having been subjected to the media mismatch determination processing is zero.

If the determination result in step S1004 indicates that the value of Flag B is "true (remaining amount is zero)" in at least one sheet type, it indicates the media mismatch (i.e. remaining amount is zero) state. More specifically, the CPU 212 determines that the remaining amount of sheets having the sheet type to be used in the print job is zero. Accordingly, in this case (No in step S1005), the operation proceeds to step S1005. For example, as illustrated in FIG. 14C, the CPU 212 displays a remaining amount zero mark 1432 indicating the media mismatch state in the entry of a print job on the hold job list 1402 in association with the print job. The remaining amount zero mark 1432 indicates that the remaining amount of the sheet to be used in the print job is zero although the sheet is set to the sheet holding unit. Then, the CPU 212 terminates the sequential media mismatch determination result notification processing (i.e., the processing in step S1000). Then, the operation returns to step S601 illustrated in FIG. 6.

On the other hand, if it is determined that the value of Flag B is false in all types of jobs having been subjected to media mismatch determination processing (YES in step S1004), it means that the remaining amount of sheets is not zero in all sheet types to be used in the print job. Therefore, the CPU 212 terminates the sequential media mismatch determination result notification processing (i.e., the processing in step S1000). Then, the operation returns to step S601 illustrated in FIG. 6.

When the result of the media mismatch determination processing indicates that the sheet type inconsistency occurs in a target job, the printing system displays the inconsistency mark in association with the job to notify the result of the media mismatch determination processing (see step S1003). Further, when the "sheet remaining amount zero" state occurs in a target job, the printing system displays the remaining amount zero mark in association with the job to notify the "sheet remaining amount zero" state (see step S1005). However, the present exemplary embodiment can be modified in the following manner. For example, any other mark (or sound or light) is usable if it can be recognized by a user to confirm the above-mentioned situation that the sheet type inconsistency occurs or the remaining amount of sheets is zero in the currently processed job, before instructing the execution of the job.

Subsequently, an example of the operation screen that can be displayed by the digital printing machine 102 according to the first exemplary embodiment, after the media mismatch determination result is notified on the hold job list 1402, is described with reference to FIG. 14C. On the other hand, the operation screen illustrated in FIG. 14B is an example that can be displayed immediately after the operator A operates the job hold function operation screen displayed on the operation unit 204 to select a print job. Each portion illustrated in FIG. 14C, if it is similar to that illustrated in FIG. 14B, is denoted by the same symbol. Similar to FIG. 14B, according to the example illustrated in FIG. 14C, the operator A successively selects Job A, Job D, and Job E and therefore each of three jobs is in selected state.

In FIG. 14C, the media mismatch determination is performed for each of the selected three jobs (i.e., Job A, Job D, and Job E) having been selected by the user, to check whether a sheet to be used in each print job matches with the sheet having been set to the sheet holding unit of the digital printing machine 102.

For example, the sheets to be used in the print job "Job A" are set to the sheet holding units as illustrated in FIGS. 17A and 17B and the remaining amount of sheets is not zero in each sheet holding unit. Accordingly, none of the inconsistency mark 1431 and the remaining amount zero mark 1432 is displayed for the Job A. In this case, before instructing the start of printing, the user can know that the possibility of causing a media mismatch is extremely low if the user presses the print start button 1412.

Further, the sheets to be used in the print job "Job D" are set to the sheet holding units as illustrated in FIGS. 17A and 17B. However, the remaining amount of sheets is zero in at least one of the sheet holding units. More specifically, the remaining amount of sheets having the size "11×17" and the media type "plain paper 1" is 0 although the sheets are set to a "sheet holding unit 9". Accordingly, if the user presses the print start button 1412 in the above-mentioned state, the media mismatch (i.e., the sheet remaining amount zero state) occurs at the sheet supply timing of the above-mentioned sheet being "11×17" sized and therefore the print processing stops. Accordingly, a display of the remaining amount zero mark 1432 appears on the right side in the display field of Job D. When the user recognizes the remaining amount zero mark 1432 displayed on the list, the user can perform an appropriate preparatory operation. More specifically, the user can replenish the sheet holding unit 9 with a sufficient amount of sheets having the size "11×17" and the media type "plain paper 1".

Further, at least one of the sheets to be used in the print job "Job E" is not set in any one of the sheet holding units as illustrated in FIGS. 17A and 17B. More specifically, the sheet being "A3" in the size and "two-sided coated paper 2" in the media type is not set in any one of the sheet holding units. Accordingly, a display of the inconsistency mark 1431 appears on the right side in the display field of Job E. If the user presses the details button 1411 in the state illustrated in FIG. 14C, the size and media type information (1728, 1729, and 1730) about the sheets to be used in the selected Job E can be displayed. In this case, the medial information (A3 and two-sided coated paper) that is not set to any one of the sheet holding units is, for example, reversely displayed to notify the user of each sheet being not set in any one of the sheet holding units. Accordingly, before instructing the start of printing, the user can know that the media mismatch (i.e., sheet type inconsistent) state may occur at the sheet feeding timing and the print job may stop if the user presses the print start button 1412 in the above-mentioned state. When the user confirms the inconsistency mark 1431 displayed on the list, the user can perform an appropriate preparatory operation. More specifically, the user can designate another sheet holding unit (preferably, a sheet holding unit that is not determined to use in the print job) and change the settings of the designated sheet holding unit to include A3 in the sheet size and "two-sided coated paper 2" in the media type. More specifically, the user can press the sheet setting button 1410 to designate the sheet holding unit that is not determined to use in the print job and change the sheet settings of the designated sheet holding unit. Further, the user can replenish the designated sheet holding unit with the corresponding sheet. In this case, if there is any sheet remaining in the sheet holding unit, the user can remove all of the remaining sheets.

In the present exemplary embodiment, as illustrated in FIG. 14C, the shape of the inconsistency mark 1431 and the shape of the remaining amount zero mark 1432 are differentiated from each other. Therefore, the user can discriminate and recognize whether the sheet to be used in the job is not set in any one of the sheet holding units or whether the remaining amount is zero although the sheet to be used in the job is set in any one of the sheet holding units. When the media mismatch determination is performed as mentioned above, it becomes possible for the user to prevent the print job from being stopped because the warning mark 1431 or 1432 is displayed in association with the print job that may cause a media mismatch.

Further, if the user selects the Job D and presses the details button 1411 in the state illustrated in FIG. 14C, information about the size and the media type (1726 and 1727) of sheets to be used in the Job D can be displayed. In this case, the CPU 212 blinks sheet information if the remaining amount of sheets is zero. Further, the CPU 212 blinks a display of the sheet holding unit to which the corresponding sheet is set. Thus, the user can identify the information about sheet size and media type of each sheet to be used in the Job D, if the remaining amount is zero, together with the sheet holding unit that stores the identified sheet. As mentioned above, even in a case where the sheet size and the media type are displayed, the CPU 212 differentiates the way of displaying sheet information when the sheet is not set in any one of the sheet holding units from the way of displaying sheet information when the remaining amount of sheets is zero. Accordingly, the user can discriminate and confirm whether the sheet having the displayed size and type is not set in any one of the sheet holding units or whether the remaining amount of sheets is zero. In this case, the printing system reversely displays the medial information that is not set in any one of the sheet holding units and blinks the displayed information about each sheet if the remaining amount is zero. However, the screen display is not limited to the above-mentioned example. For example, it is feasible to display the sheet information in association with the inconsistency mark 1431 or the remaining amount zero mark 1432.

Figure 11:
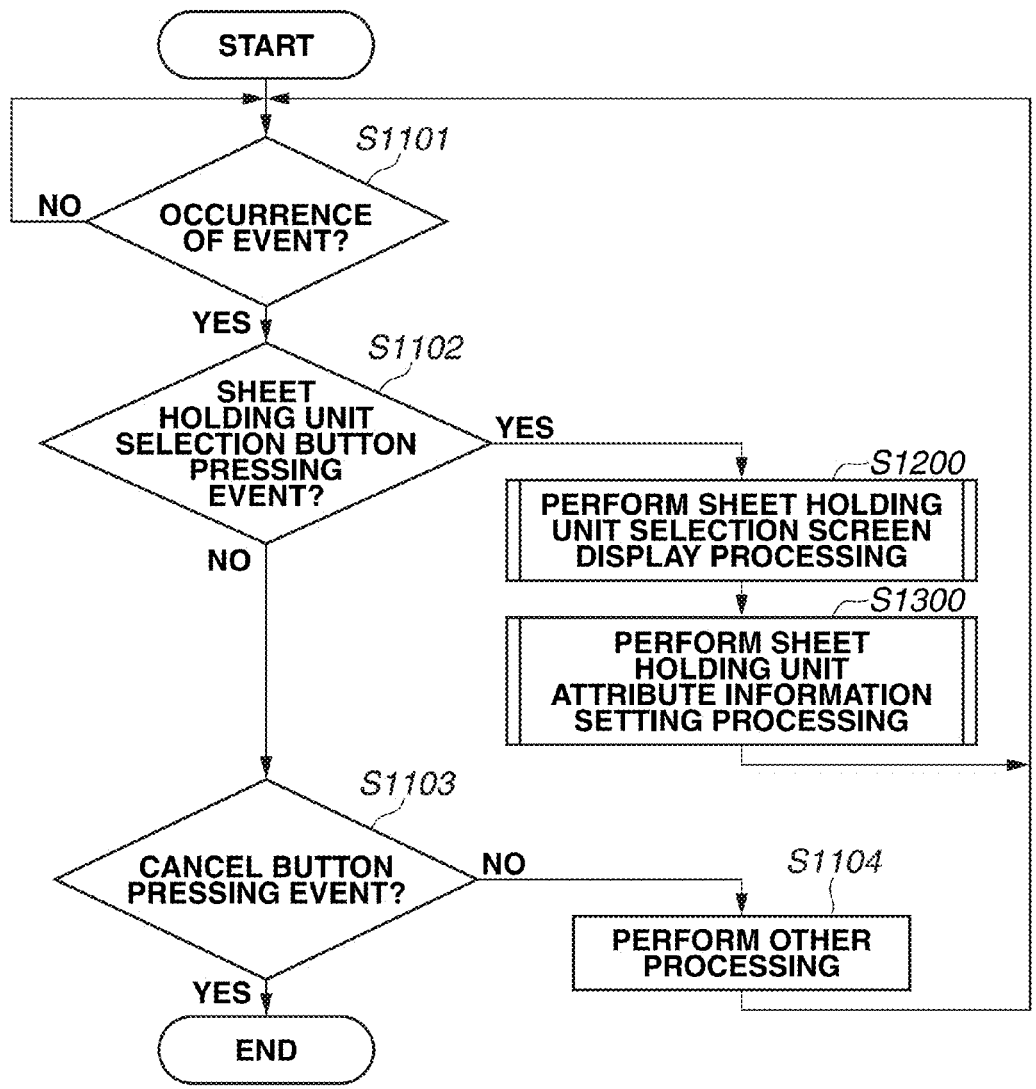
FIG. 11 is a flowchart illustrating sheet setting processing (see step S1100) illustrated in FIG. 6, which can be performed by the digital printing machine according to the first exemplary embodiment.

FIG. 11 is a flowchart illustrating the processing to be performed in step S1100 illustrated FIG. 6, to perform settings for the sheet to be used in the selected print job. To attain the processing illustrated in FIG. 11, the CPU 212 of the controller unit 205 executes the UI function program that is read out of the ROM 207 or the HDD 209 and loaded into the RAM 208. The CPU 212 starts the processing of the flowchart illustrated in FIG. 1n a state where a mismatch sheet list screen 1501 illustrated in FIG. 15A is displayed on the operation unit 204 and a mismatch sheet is selected from a sheet list 1502.

The mismatch sheet list screen 1501 is a screen that allows a user to perform mismatch sheet settings for a job in which the media mismatch has occurred. The sheet list 1502 can be created by adding up mismatch sheets of media mismatch (sheet type inconsistency) jobs, of the sheets to be used for respective jobs being in selected state in the hold job list 1402. According to the example illustrated in FIG. 15A, the sheet list 1502 displays only the mismatch sheets. However, the sheet list 1502 can be configured to display all sheets to be used in the job being in selected state on the hold job list 1402. Determining the mismatch sheet of each media mismatch (sheet type inconsistency) job is feasible by referring to the value of the above-mentioned flag (Flag A) that holds the media mismatch determination result being set for each sheet type to be used in the job.

According to the example illustrated in FIG. 15A, information about an "A4 Paper1" sheet and an "A3 thick paper"

sheet is displayed on the sheet list 1502. The user can know that the "A3 thick paper" sheet is in a selected state and the "A4 Paper1" sheet is not in a selected state. Further, the user can know that the "A4 Paper1" sheet is the paper to be used in the job secondly selected on the hold job list 1402 and the "A3 thick paper" sheet is the paper to be used in the job fourthly selected on the hold job list 1402.

Further, the user can know the occurrence of a media mismatch in each sheet type by checking the inconsistency mark 1431 displayed in association with each of the "A3 thick paper" sheet and the "A4 Paper1" sheet.

In step S1101, the CPU 212 checks if a user instruction is input via the screen illustrated in FIG. 15A, which can be displayed on the operation unit 204. The CPU 212 repeats the processing in step S1101 until a user performs an input operation. If a user instruction is input via the operation unit 204 (YES in step S101), the operation proceeds to step S1102. In a state where no sheet is selected, a sheet details button 1503 and a sheet holding unit selection button 1505 (i.e., two buttons illustrated in FIG. 15A) are brought into a gray-out state and therefore cannot be pressed.

In step S1102, the CPU 212 determines whether the user operation is an event to press the sheet holding unit selection button 1505. If it is determined that the sheet holding unit selection button 1505 has been pressed (YES in step S1102), the operation proceeds to step S1200.

In step S1200, the CPU 212 performs sheet holding unit selection screen display processing. Then, the operation proceeds to step S1300. The processing to be performed in step S1200 is described in detail below with reference to FIG. 12.

In step S1300, the CPU 212 performs sheet holding unit attribute information setting processing. Then, the operation returns to step S1101. The processing to be performed in step S1300 is described in detail below with reference to FIG. 13.

On the other hand, if it is determined that the sheet holding unit selection button 1505 has not been pressed (NO in step S1102), the operation proceeds to step S1103. In step S1103, the CPU 212 determines whether the user operation is an event to press a cancel button 1504. If it is determined that the cancel button 1504 has been pressed (YES in step S1103), the CPU 212 discards the information being set on the mismatch sheet list screen 1501. Then, the CPU 212 terminates the setting for the sheet to be used in the selected print job (i.e., the processing in step S1100 illustrated in FIG. 6). Then, the operation returns to step S601 illustrated in FIG. 6.

On the other hand, if it is determined that the cancel button 1504 has not been pressed (NO in step S1103), the operation proceeds to step S1104. In step S1104, the CPU 212 performs other processing according to a user operation (instruction). Then, the operation returns to step S1101. For example, the processing to be performed in step S1104 includes changing the screen to a sheet details information screen 1521 illustrated in FIG. 15C in response to a pressing of the sheet details button 1503. The user can know detailed information about sheet attribute information, such as a sheet name, size, a grammage, a surface property, a feature, a color, and an adjustment of creep (deviation) correction amount, with reference to the sheet details information screen 1521 illustrated in FIG. 15C.

Figure 12:
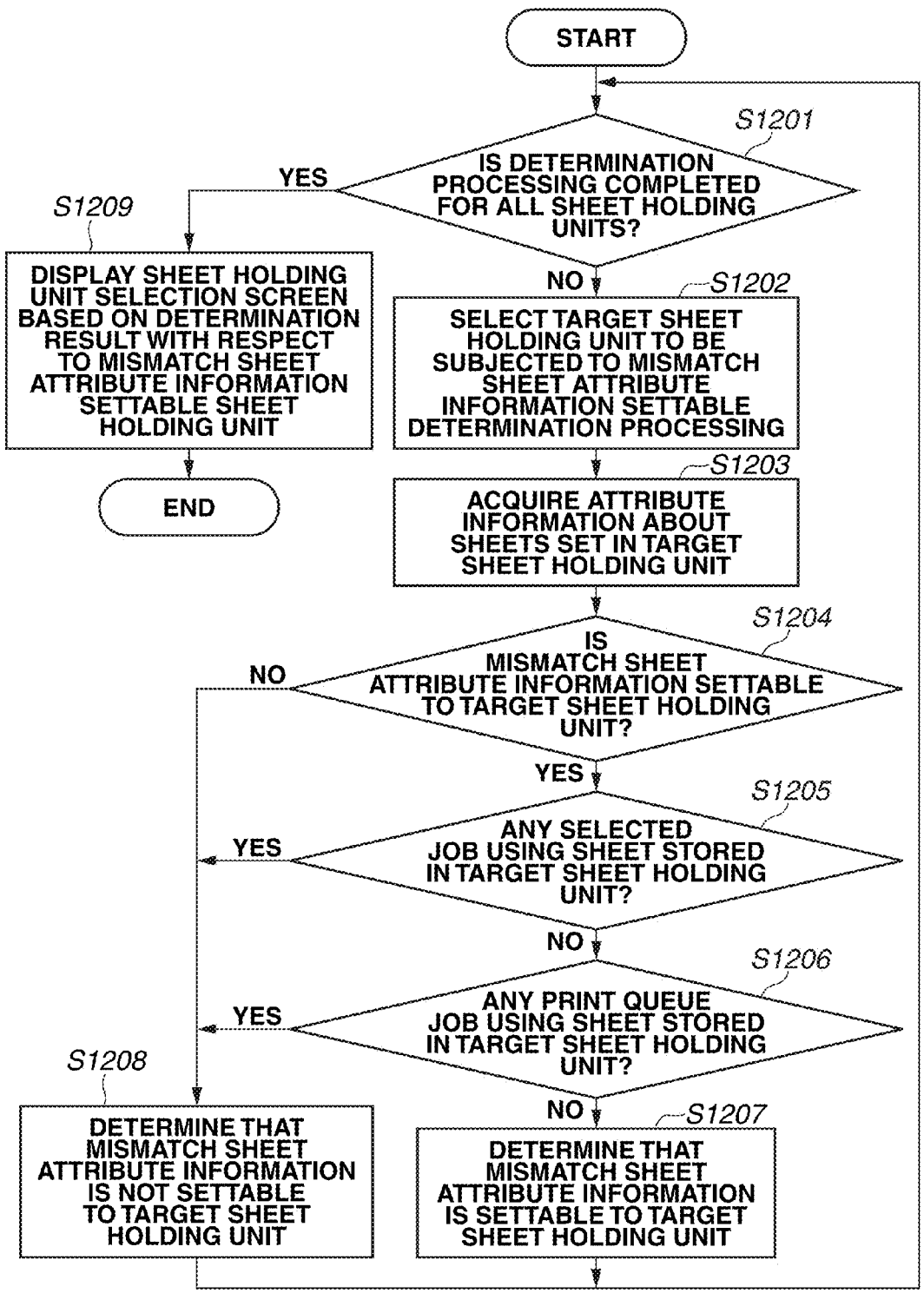
FIG. 12 is a flowchart illustrating sheet holding unit selection screen display processing (see step S1200) illustrated in FIG. 11, which can be performed by the digital printing machine according to the first exemplary embodiment.

FIG. 12 is a flowchart illustrating the processing to be performed in step S1200 illustrated in FIG. 11, which is the processing to display a screen that enables a user to select a mismatch sheet attribute information settable sheet holding unit. To attain the processing illustrated in FIG. 12, the CPU 212 of the controller unit 205 executes the UI function program that is read out of the ROM 207 or the HDD 209 and loaded into the RAM 208. Each mismatch sheet being in selected state on the sheet list 1502 illustrated in FIG. 15A is a target mismatch sheet to be subjected to the processing in step S1200.

In step S1201, the CPU 212 determines whether the determination processing has been completed for all sheet holding units to determine a sheet holding unit to which the mismatch sheet attribute information is settable. If it is determined that the determination processing is not yet completed for all sheet holding units (NO in step S1201), the operation proceeds to step S1202.

In step S1202, the CPU 212 selects a target sheet holding unit to be subjected to mismatch sheet attribute information settability determination processing. Then, the operation proceeds to step S1203.

In step S1203, the CPU 212 acquires attribute information about the sheet set in the target sheet holding unit. More specifically, the CPU 212 can instruct the media management unit 211 to acquire attribute information about the sheet set in the target sheet holding unit with reference to the sheet management table illustrated in FIG. 17A.

Subsequently, the operation proceeds to step S1204. The CPU 212 determines whether the mismatch sheet attribute information is settable to the target sheet holding unit determined in step S1202. The determination whether specific sheet attribute information is settable to the sheet holding unit depends on the combination of media type and sheet holding unit. For example, the sheet holding unit 1 is smaller in the size of accommodatable papers, compared to other sheet holding units. Therefore, any sheet whose size is greater than A4 cannot be stored in the sheet holding unit 1. Therefore, A3 sheets cannot be set in the sheet holding unit 1. Further, for example, a portion that rolls a sheet is provided in a conveyance path extending from the paper feed tray. Therefore, if a sheet has a larger grammage, it is unfeasible for the sheet to pass the above-mentioned rolling portion. The sheet having a large grammage cannot be set in any one of the sheet holding units.

As mentioned above, feeding a specific sheet may be restricted if the sheet holding unit is inappropriate in position, sheet size, or sheet grammage.

If the determination result in step S1204 indicates that the mismatch sheet attribute information is settable to the sheet holding unit determined in step S1202 (YES in step S1204), the operation proceeds to step S1205. On the other hand, if it is determined that the mismatch sheet attribute information is not settable to the sheet holding unit determined in step S1202 (NO in step S1204), the operation proceeds to step S1208.

In step S1205, the CPU 212 determines whether at least one of jobs selected from the hold job list 1402 uses the sheet stored in the target sheet holding unit determined in step S1202. If it is determined that there is not any selected job that uses the sheet stored in the target sheet holding unit (NO in step S1205), the operation proceeds to step S1206. If it is determined that there is at least one selected job that uses the sheet stored in the target sheet holding unit (YES in step S1205), the operation proceeds to step S1208.

In step S1206, the CPU 212 determines whether at least one of jobs displayed on the print job list 1403 uses the sheet stored the target sheet holding unit determined in step S1202. If it is determined that there is not any print queue job that uses the sheet stored in the target sheet holding unit (NO in step S1206), the operation proceeds to step S1207.

On the other hand, if it is determined that there is at least one print queue job that uses the sheet stored in the target sheet holding unit (YES in step S1206), the operation proceeds to step S1208.

In step S1207, the CPU 212 determines that the mismatch sheet attribute information is settable to the sheet holding unit determined in step S1202. Then, the operation returns to step S1201 to repeat the processing in step S1201 and subsequent steps.

On the other hand, in step S1208, the CPU 212 determines that the mismatch sheet attribute information is not settable to the sheet holding unit determined in step S1202. Then, the operation returns to step S1201 to repeat the processing in step S1201 and subsequent steps.

On the other hand, if the determination result in step S1201 indicates that the determination processing has been completed for all sheet holding units (YES in step S1201), the operation proceeds to step S1209. In step S1209, the CPU 212 causes the operation unit 204 to display a sheet holding unit selection screen 1511 illustrated in FIG. 15B based on the determination result (step S1207 or step S1208) with respect to the mismatch sheet attribute information settable sheet holding unit.

After completing the processing in step S1209, the CPU 212 terminates the sequential processing relating to step S1200 illustrated in FIG. 11. Then, the operation proceeds to step S1300 illustrated in FIG. 11.

Figure 18:
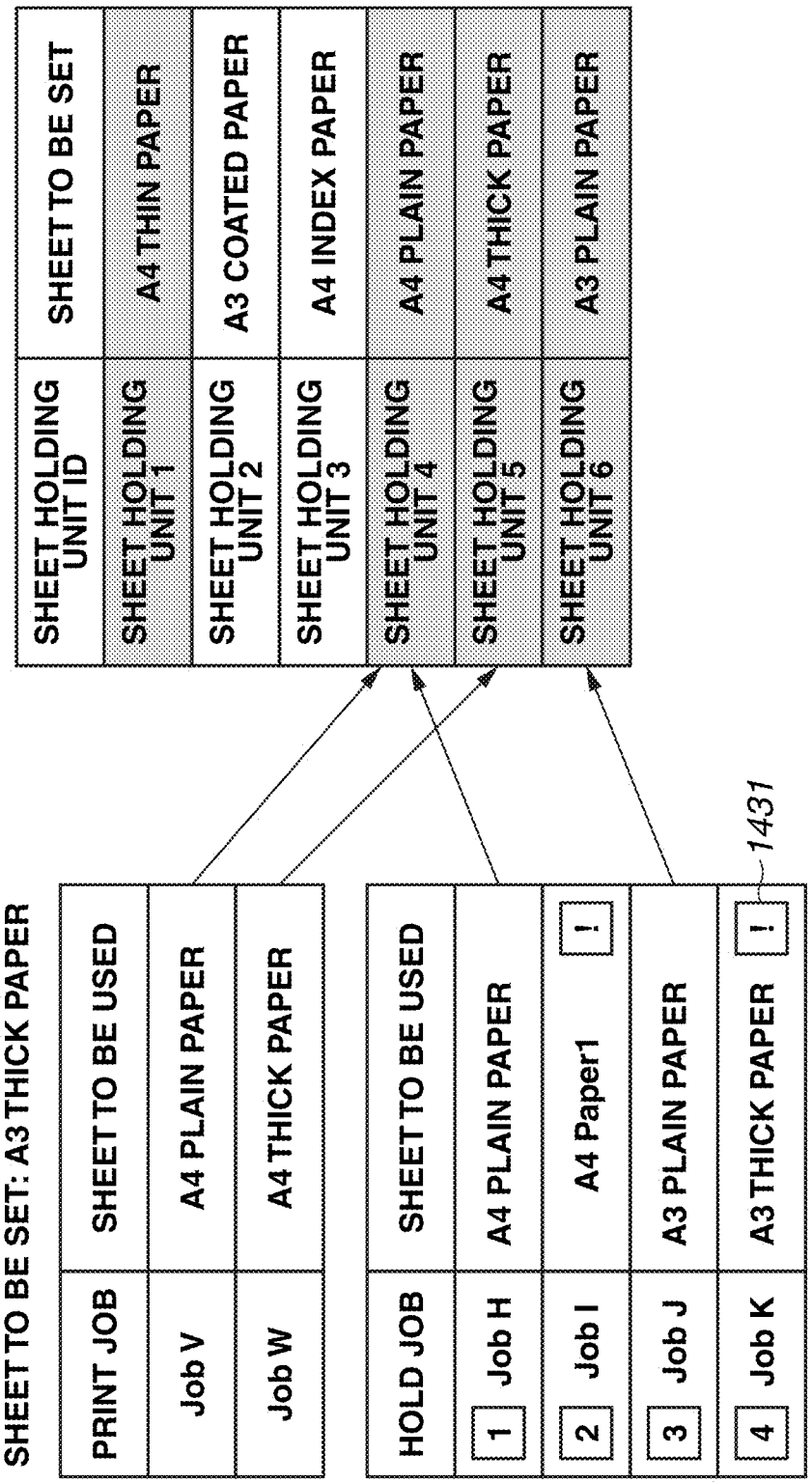
FIG. 18 illustrates a sheet holding unit related determination result, which can be obtained by the digital printing machine according to the first exemplary embodiment.

FIG. 18 illustrates a determination result with respect to the mismatch sheet attribute information settable sheet holding unit. According to the example illustrated in FIG. 18, attribute information about the sheet to be set (mismatch sheet) is "A3 thick paper". Further, it is restricted in such a way that the A3 sheet cannot be set to the sheet holding unit 1. Job H, Job I, Job J, and Job K are target selection jobs (hold jobs) to be sequentially subjected to the determination processing in step S1205. The paper to be used in the Job H is "A4 plain paper". The paper to be used in the Job I is "A4 Paper1". The paper to be used in the Job J is "A3 plain paper". The paper to be used in the Job K is "A3 thick paper". Further, the "A4 Paper1" to be used in the Job I and the "A3 thick paper" to be used in the Job K are not set to any sheet holding unit. In other words, these papers are mismatch sheets. Therefore, the inconsistency mark 1431 is displayed in association with each mismatch sheet. As illustrated in FIG. 18, each of the sheet holding unit 2 and the sheet holding unit 3 is determined as the sheet holding unit to which the "A3 thick paper" is settable.

Figure 13:
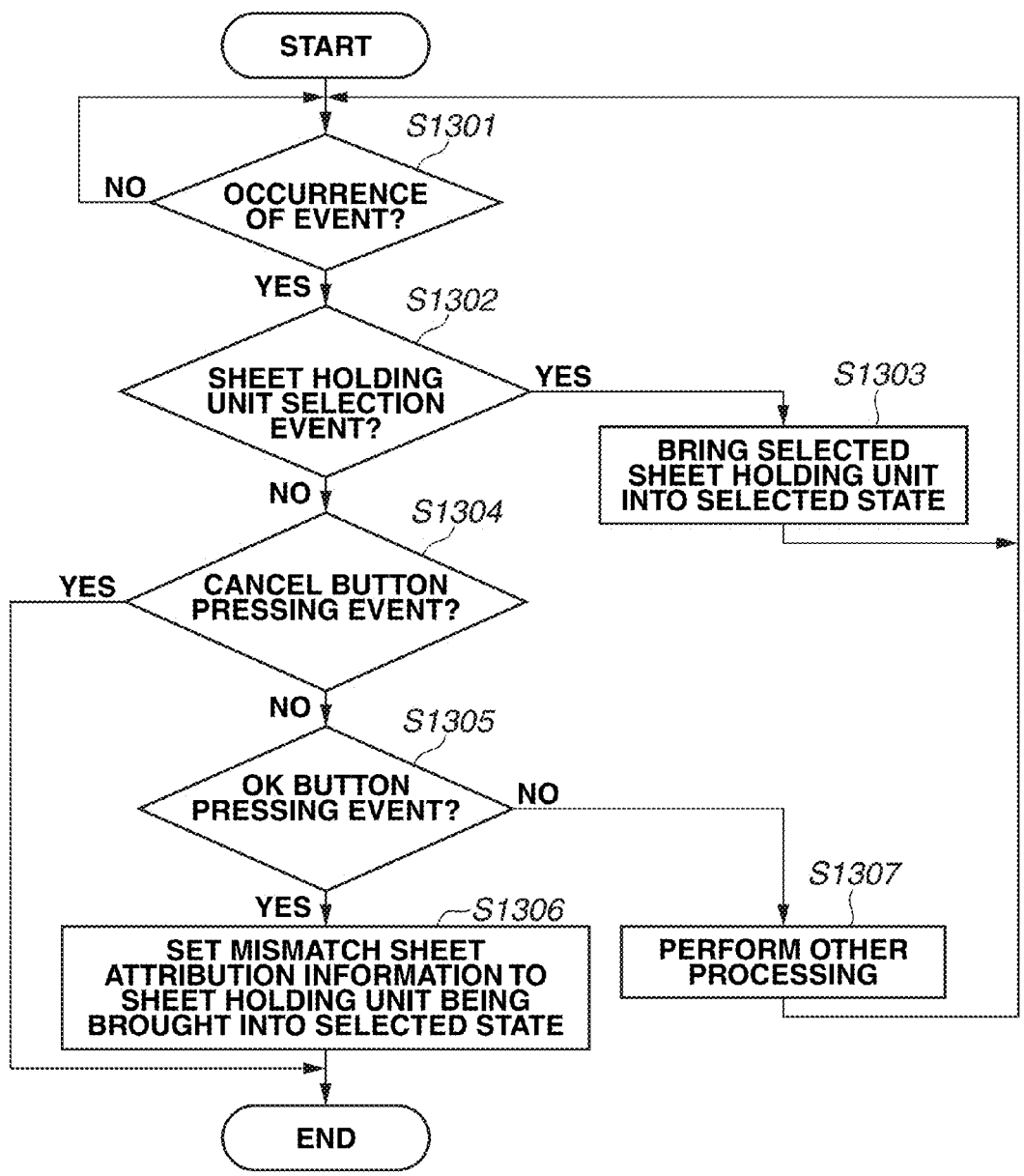
FIG. 13 is a flowchart illustrating sheet holding unit attribute information setting processing (see step S1300) illustrated in FIG. 11, which can be performed by the digital printing machine according to the first exemplary embodiment.

FIG. 13 is a flowchart illustrating the processing to be performed in step S1300 illustrated in FIG. 11, which is the sheet holding unit attribute information setting processing. To attain the processing illustrated in FIG. 13, the CPU 212 of the controller unit 205 executes the UI function program that is read out of the ROM 207 or the HDD 209 and loaded into the RAM 208. The CPU 212 starts the processing illustrated in the flowchart in FIG. 13 in a state where the sheet holding unit selection screen 1511 is displayed on the operation unit 204.

In step S1301, the CPU 212 checks if a user instruction is input via the sheet holding unit selection screen 1511 illustrated in FIG. 15B, which can be displayed on the operation unit 204. The CPU 212 repeats the processing in step S1301 until a user performs an input operation. If a user instruction is an input operation via the operation unit 204 (YES in step S1301), the operation proceeds to step S1302. In a state where no sheet holding unit is selected, a sheet details button 1512 and an OK button 1514 (i.e., two buttons illustrated in FIG. 15B) are brought into a gray-out state and therefore cannot be pressed. Further, if the mismatch sheet attribute information is not settable, the sheet holding unit determined in step S1200 illustrated in FIG. 11 is brought into a gray-out state and cannot be selected. According to the example illustrated in FIG. 15B, each of the sheet holding unit 1, the sheet holding unit 4, the sheet holding unit 5, and the sheet holding unit 6 is the sheet holding unit determined as being unsettable with respect to the A3 thick paper. On the other hand, each of the sheet holding unit 2 and the sheet holding unit 3 is the sheet holding unit determined as being settable with respect to the A3 thick paper.

In step S1302, the CPU 212 determines whether the user operation is the event to select a sheet holding unit to which the mismatch sheet attribute information is settable. If it is determined that the user operation is the event to select the sheet holding unit to which the mismatch sheet attribute information is settable (YES in step S1302), the operation proceeds to step S1303. In step S1303, the CPU 212 brings the selected sheet holding unit into selected state. Then, the operation returns to step S1301. According to the example illustrated in FIG. 15B, the user can know that the sheet holding unit being in selected state is the sheet holding unit 2 determined as being settable with respect to the A3 thick paper.

On the other hand, if it is determined that the user operation is not the event to select the sheet holding unit to which the mismatch sheet attribute information is settable (NO in step S1302), the operation proceeds to step S1304. If it is determined that the user operation is the event to select the sheet holding unit to which the mismatch sheet attribute information is settable (YES in step S1302), the sheet holding unit is brought into selected state in step S1303 and the operation returns to step S1301. Therefore, the CPU 212 performs the processing in step S1304 and subsequent steps in a state where the sheet holding unit to which the mismatch sheet is settable is already selected.

In step S1304, the CPU 212 determines whether the user operation is the event to press a cancel button 1513. If it is determined that the user operation is the event to press the cancel button 1513 (YES in step S1304), the CPU 212 discards the information being set on the sheet holding unit selection screen 1511. Then, the CPU 212 terminates the sheet holding unit attribute information setting processing (i.e., the processing in step S1300 illustrated in FIG. 11). Then, the operation returns to step S1101 illustrated in FIG. 11.

On the other hand, if it is determined that the user operation is not the event to press the cancel button 1513 (NO in step S1304), the operation proceeds to step S1305. In step S1305, the CPU 212 determines whether the user operation is the event to press the OK button 1514. If it is determined that the OK button 1514 has been pressed (YES in step S1305), the operation proceeds to step S1306.

In step S1306, the CPU 212 sets mismatch sheet attribution information about the job in which the media mismatch occurs to the sheet holding unit being brought into the selected state in step S1303. According to the example illustrated in FIG. 15B, the A3 thick paper is set to the sheet holding unit 2 being in selected state. Then, the CPU 212 terminates the sheet holding unit attribute information setting processing (i.e., the processing in step S1300 illustrated in FIG. 11). Then, the operation returns to step S1100 illustrated in FIG. 11.

On the other hand, if it is determined that the OK button 1514 has not been pressed (NO in step S1305), the operation proceeds to step S1307. In step S1307, the CPU 212 performs other processing if it is instructed by a user operation. Then, the operation returns to step S1301. For example, the processing to be performed in step S1307 includes displaying the sheet details information screen 1521 illustrated in FIG. 15C in response to a pressing of the sheet details button 1512.

As described above, the CPU 212 performs the sequential sheet setting processing in step S1100 illustrated in FIG. 6.

As described above, to solve the media mismatch (sheet type inconsistent) state, the printing system according to the first exemplary embodiment prevents a sheet holding unit, if it is determined to be used in a selected hold job (or print job), from being selected when the mismatch sheet attribute information is set to the sheet holding unit. Therefore, the printing system according to the first exemplary embodiment can prevent the printing of another job from being stopped because of a new media mismatch that may occur when a user erroneously changes the setting of attribute information about the sheet holding unit to be used in the selected hold job (or print job).

According to the example illustrated in the sheet holding unit selection screen 1511 in FIG. 15B, each sheet holding unit to be used in the selected hold job (or print job) is brought into a gray-out state to prevent the sheet holding unit from being selected by the user, as mentioned above. However, the screen display is not limited to the above-mentioned example. For example, it is useful to allow each user to arbitrarily select the sheet holding unit to be used in the selected hold job (or print job), instead of bringing the sheet holding unit into a gray-out state. In this case, the printing system can be configured to notify a user of a possibility that the printing of another job may stop when the above-mentioned sheet holding unit is selected by the user.

In the first exemplary embodiment, if it is determined that the mismatch sheet attribute information is not settable to all sheet holding units provided in the printing apparatus, as a result of the mismatch sheet attribute information settable sheet holding unit determination processing, it is useful to instruct a user to release the mismatch job from the selected state. In this case, in step S1209 illustrated in FIG. 12, the CPU 212 displays a warning screen 1601 illustrated in FIG. 16A, instead of displaying the sheet holding unit selection screen 1511 illustrated in FIG. 15B on the operation unit 204. While confirming the warning screen 1601, the user can know that the printing of a job that uses the mismatch sheet is unfeasible because the attribute information about the sheet to be used in the mismatch job cannot be set to all sheet holding units. If a user selects the mismatch sheet on the warning screen 1601 and presses a selection release button 1602, the mismatch job can be released from the selected state. If the mismatch job is released from the selected state on the warning screen 1601 and each hold job being in selected state is brought into non-mismatch state, the printing system can cause the operation unit 204 to display a notification screen 1611 illustrated in FIG. 16B. While confirming the notification screen 1611, the user can know that the printing of the hold job being in selected state can be immediately started because the attribute information about the sheet to be used in the hold job being in selected state is set to all sheet holding units.

As mentioned above, to solve the media mismatch state, the printing system according to the first exemplary embodiment prevents a sheet holding unit, if it is determined to be used in a selected hold job (or print job), from being selected when the mismatch sheet attribute information is set to the sheet holding unit.

However, if it is determined that all sheet holding units provided in the printing apparatus can be used for a selected hold job (or print job), it becomes unfeasible to set the mismatch sheet attribute information to the sheet holding unit to solve the media mismatch state.

On the other hand, it is general that the priority of each job is taken into consideration in printing. Therefore, a user may want the printing system to start the printing of a higher-priority job at timing earlier than the printing of a lower-priority job.

In view of the foregoing, to solve the media mismatch (sheet type inconsistent) state, a printing system according to a second exemplary embodiment prevents a sheet holding unit, if it is determined to be used in a higher-priority job, from being selected when the mismatch sheet attribute information is set to the sheet holding unit. On the other hand, the printing system according to the second exemplary embodiment allows a user to select a sheet holding unit to be used in a lower-priority job so that the mismatch sheet attribute information can be set to the sheet holding unit, as described below.

The printing system according to the second exemplary embodiment has a configuration that is similar to that described in the first exemplary embodiment. The digital printing machine 102 and the computer 101 are connected via the network 100. Further, a function block diagram illustrating a functional configuration of the digital printing machine 102 according to the second exemplary embodiment is similar to that described in the first exemplary embodiment. A hardware block diagram illustrating a system configuration of the computer (PC) 101 according to the second exemplary embodiment is similar to that described in the first exemplary embodiment. Therefore, redundant description thereof will be avoided. Sequential flowcharts illustrating processing to be performed by the digital printing machine 102 according to the second exemplary embodiment are similar to those illustrated in FIGS. 6 to 13 described in the first exemplary embodiment. Therefore, redundant description thereof will be avoided. The second exemplary embodiment is different from the first exemplary embodiment in the content of the mismatch sheet attribute information settable sheet holding unit determination processing.

Figure 19:
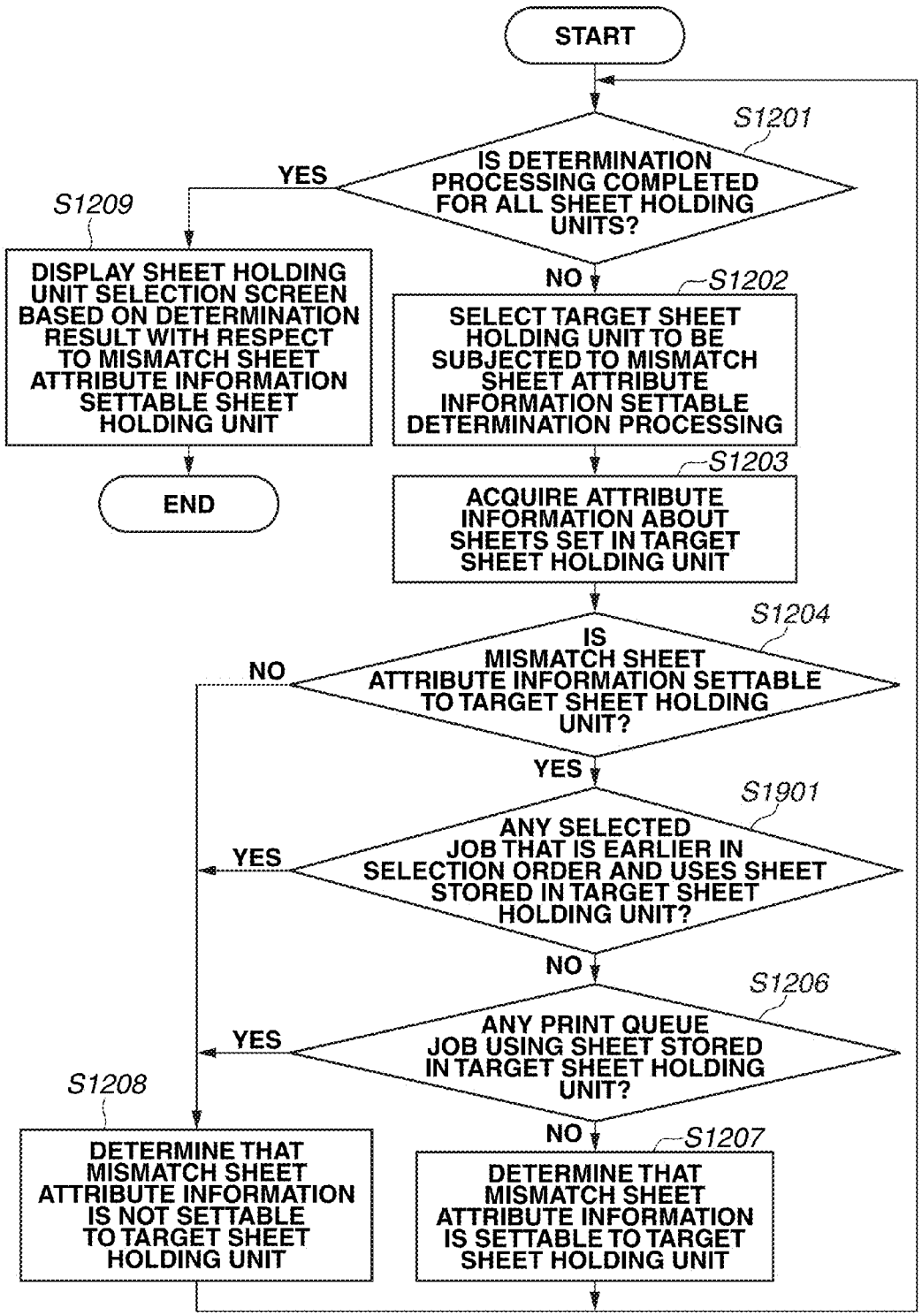
FIG. 19 is a flowchart illustrating sheet holding unit selection screen display processing (see step S1200) illustrated in FIG. 11, which can be performed by the digital printing machine according to a second exemplary embodiment.

FIG. 19 is a flowchart illustrating the processing that can be performed by the printing system according to the second exemplary embodiment to display a screen that allows a user to select a mismatch sheet attribute information settable sheet holding unit. The processing according to the flowchart illustrated in FIG. 19 is comparable to the processing performed in step S1200 illustrated in FIG. 11. In the flowchart illustrated in FIG. 19, the same step number is used to denote a step if the processing to be performed in the step is similar to that described in the first exemplary embodiment with reference to FIG. 12. Hereinafter, differences between the processing in FIG. 19 and the processing in FIG. 12 are mainly described.

If the determination result in step S1204 indicates that the mismatch sheet attribute information is settable to the target sheet holding unit determined in step S1202 (YES in step S1204), the operation proceeds to step S1901.

In step S1901, the CPU 212 determines whether there is any job selected from the hold job list 1402, which is earlier in selection order than the mismatch job and uses the sheet stored in the target sheet holding unit determined in step S1202. As illustrated in FIG. 14B, a numerical value of each selection mark (1421, 1422, or 1423) displayed on the left side of the job name field indicates the selection order of the hold job.

If the determination result in step S1901 indicates that there is not any hold job that is earlier in selection order and uses the sheet stored in the target sheet holding unit determined in step S1202 (NO in step S1901), the operation proceeds to step S1206 to perform subsequent processing. On the other hand, if it is determined that there is a hold job that is earlier in selection order and uses the sheet stored in the target sheet holding unit determined in step S1202 (YES in step S1901), the operation proceeds to step S1208 to perform the above-mentioned processing.

As mentioned above, the processing that can be performed by the printing system according to the second exemplary embodiment is different from that described in the first exemplary embodiment.

FIG. 20 illustrates a determination result with respect to the mismatch sheet attribute information settable sheet holding unit according to the second exemplary embodiment.

According to the example illustrated in FIG. 20, attribute information about the sheet to be set (mismatch sheet) is "A4 Paper1". Further, it is restricted in such a way that the A3 sheet cannot be set to the sheet holding unit 1. Job H, Job I, Job J, and Job K are target selection jobs (hold jobs) to be sequentially subjected to the determination processing in step S1304. The paper to be used in the Job H is "A4 plain paper". The paper to be used in the Job I is "A4 Paper1". The paper to be used in the Job J is "A3 plain paper". The paper to be used in the Job K is "A3 thick paper". Further, the "A4 Paper1" to be used in the Job I and the "A3 thick paper" to be used in the Job K are not set to any sheet holding unit. In other words, these papers are mismatch sheets. Therefore, the inconsistency mark 1431 is displayed in association with each mismatch sheet. For example, the media mismatch (sheet type inconsistent) state can be solved by setting the mismatch sheet (i.e., "A4 Paper1") of the Job I to the sheet holding unit, as described below. The Job H has a priority level higher than that of the Job I, because the Job H is ranked as the first hold job in the selection order. On the other hand, the Job I is ranked as the second hold job in the selection order. Further, each print job (i.e., Job V and Job W) has a priority level higher than those of the hold jobs (i.e., Job H, Job I, Job J, and Job K). As illustrated in FIG. 20, each of the sheet holding unit 1, the sheet holding unit 2, the sheet holding unit 3, and the sheet holding unit 6 is determined as the sheet holding unit to which the "A4 Paper1" is settable.

Then, in step S1209 illustrated in FIG. 19, the CPU 212 causes the operation unit 204 to display a sheet holding unit selection screen 2101 on which each of the sheet holding unit 4 and the sheet holding unit 5 (i.e., the sheet holding units to which the "A4 Paper1" is not settable) is brought into a gray-out state as illustrated in FIG. 21. Therefore, the sheet holding unit 4 and the sheet holding unit 5 cannot be selected.

As described above, to solve the sheet type inconsistent state, the printing system according to the second exemplary embodiment prevents a sheet holding unit, if it is determined to be used in a hold job (or print job) having a priority level higher than that of the mismatch job, from being selected when the mismatch sheet attribute information is set to the sheet holding unit.

Therefore, even if a user erroneously changes the setting of the attribute information about the sheet holding unit to be used in the job being higher than the mismatch job in priority level, the printing system according to the second exemplary embodiment can prevent the printing of another higher-priority job from being stopped due to a newly induced media mismatch.

Further, the printing system according to the second exemplary embodiment allows a user to select a sheet holding unit to be used in a job having a priority level lower than that of the mismatch job when the mismatch sheet attribute information is set to the sheet holding unit. However, if there is a sheet holding unit that is not used in a selected hold job (or print job), the printing system according to the second exemplary embodiment can prevent a user from selecting the sheet holding unit to be used in the job being lower than the mismatch job in priority level.

Further, the printing system according to the second exemplary embodiment refers to the mismatch job selection order, with respect to the hold job, in discriminating a higher-priority job from a lower-priority job. However, the discrimination method is not limited to the above-mentioned example. For example, if the usage history of individual hold jobs can be stored in the HDD 209, it is useful to refer to the usage history of each job in discriminating a higher-priority job from a lower-priority job.

The present invention is not limited to the above-mentioned exemplary embodiments and can be modified in various ways (including any possible combination of the above-mentioned exemplary embodiments) within the scope of the present invention.

For example, in the present exemplary embodiment, the CPU (i.e., the control unit) of the digital printing machine 102 is configured to perform the above-mentioned various controls. However, an external controller (serving as a printing control apparatus) can be provided separately from the digital printing machine 102 and can be configured to perform a part or the whole of the above-mentioned various controls.

Although the present invention has been described based on various exemplary embodiments, it is apparent to a person skilled in the art that the scope or the gist of the present invention is not limited to a specific part of the description.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing apparatus comprising:
   at least one processor coupled to a memory;
   a job holding unit configured to hold jobs, wherein each of the jobs is configured to perform printing an image on a sheet which is conveyed from at least one sheet holding unit of a plurality of sheet holding units;
   a selecting unit configured to select a job from among the jobs held by the job holding unit;
   a receiving unit configured to receive, from a user, an execution instruction to execute the job selected by the selecting unit;
   a performing unit configured to perform the job for which the execution instruction is received by the receiving unit;
   a displaying unit configured to display a screen for selecting at least one sheet holding unit of the plurality of sheet holding units for which attribute information of a sheet, to be used in a first job selected by the selecting unit, is to be stored; and
   a notification unit configured to notify, on the screen in a distinguishable manner, a user of a first sheet holding unit of the plurality of sheet holding units which is used in printing of a second job and a second sheet holding unit of the plurality of sheet holding units which is not used in printing of the second job,
   wherein at least the selecting unit, the receiving unit, and the notification unit are implemented by the at least one processor.

2. The printing apparatus according to claim 1, wherein, before the execution instruction for the first job is received by the receiving unit, the notification unit notifies, on the screen, the user of the first sheet holding unit which is used in printing of the second job and the second sheet holding unit which is not used in printing of the second job.

3. The printing apparatus according to claim 1, wherein the notification unit notifies, on the screen, the user that the sheet holding unit which is used in printing of the second job is not able to be selected as a sheet holding unit for which the attribute information of the sheet to be used in the first job is to be stored.

4. The printing apparatus according to claim 1,
   wherein the screen includes buttons for selecting the plurality of sheet holding units for which the attribute information of the sheet to be used in the first job is to be stored,
   wherein, by displaying a first button for selecting the first sheet holding unit of the plurality of sheet holding units which is used in printing of the second job and a second button for selecting the second sheet holding unit of the plurality of sheet holding units which is not used in printing of the second job, the notification unit notifies, on the screen, the user of the first sheet holding unit which is used in printing of the second job and the second sheet holding unit which is not used in printing of the second job, and
   wherein a color of the second button is different from a color of the first button.

5. The printing apparatus according to claim 1, wherein the second job is a job which is performed by the performing unit at a timing that is earlier than a timing at which the performing unit performs the first job.

6. The printing apparatus according to claim 1, wherein the second job is a job for which the receiving unit has received the execution instruction.

7. The printing apparatus according to claim 1, wherein the second job is a job which has been selected by the selecting unit at a timing that is earlier than a timing at which the selecting unit selects the first job.

8. The printing apparatus according to claim 1, further comprising a print queue buffer configured to store a print job,
   wherein the print job stored in the print queue buffer is performed in turn, and
   wherein the second job is a job which is stored in the print queue buffer.

9. The printing apparatus according to claim 1, further comprising a determining unit configured to determine whether attribute information about a sheet to be used in the job selected by the selecting unit corresponds to sheet attribute information stored for each of the plurality of sheet holding units,
   wherein the first job is a job of which the determining unit has determined that the attribute information about the sheet to be used in the first job does not correspond to the sheet attribute information stored for each of the plurality of sheet holding units.

10. The printing apparatus according to claim 9, wherein the second job is a job of which the determining unit has determined that the attribute information about the sheet to be used in printing of the second job corresponds to the sheet attribute information stored for each of the plurality of sheet holding units.

11. The printing apparatus according to claim 9, wherein, before the execution instruction for the job selected by the selecting unit is received by the receiving unit, the determining unit determines whether the attribute information about the sheet to be used in the job selected by the selecting unit corresponds to the sheet attribute information stored for each of the plurality of sheet holding units.

12. The printing apparatus according to claim 9, further comprising an instruction unit configured to instruct for determining whether the attribute information about the sheet to be used in the job selected by the selecting unit corresponds to the sheet attribute information stored for each of the plurality of sheet holding units,
   wherein, in response to an instruction from the instruction unit, the determining unit determines whether the attribute information about the sheet to be used in the job selected by the selecting unit corresponds to the sheet attribute information stored for each of the plurality of sheet holding units.

13. The printing apparatus according to claim 1, further comprising a job displaying unit configured to display jobs held in the job holding unit, wherein the selecting unit selects the job from among the jobs displayed by the job displaying unit.

14. The printing apparatus according to claim 1, wherein the attribute information includes at least one of a sheet size and a sheet grammage.

15. A printing apparatus comprising:
   at least one processor coupled to a memory;
   a job holding unit configured to hold jobs, wherein each of the jobs is configured to perform printing an image on a sheet which is conveyed from at least one sheet holding unit of a plurality of sheet holding units;
   a selecting unit configured to select a job from among the jobs held by the job holding unit;
   a receiving unit configured to receive, from a user, an execution instruction to execute the job selected by the selecting unit;

a performing unit configured to perform the job for which the execution instruction is received by the receiving unit; and a displaying unit configured to display a screen for selecting at least one sheet holding unit of the plurality of sheet holding units for which attribute information of a sheet, to be used in a first job selected by the selecting unit, is to be stored, wherein at least one sheet holding unit of the plurality of sheet holding units for a sheet which is not used in printing of a second job is able to be specified by a user on the screen, and wherein at least the selecting unit and the receiving unit are implemented by the at least one processor.

16. A control method for a printing apparatus, the control method comprising:

holding jobs in a job holding unit, wherein each of the jobs is configured to perform printing an image on a sheet which is conveyed from at least one sheet holding unit of a plurality of sheet holding units;

selecting a job from among the jobs held by the job holding unit;

receiving, from a user, an execution instruction to execute the selected job;

performing the job for which the execution instruction is received;

displaying, on a displaying unit, a screen for selecting at least one sheet holding unit of the plurality of sheet holding units for which attribute information of a sheet, to be used in a selected first job, is to be stored; and notifying, on the screen in a distinguishable manner, a user of a first sheet holding unit of the plurality of sheet holding units which is used in printing of a second job and a second sheet holding unit of the plurality of sheet holding units which is not used in printing of the second job.

17. The control method according to claim 16, wherein, before the execution instruction for the first job is received, notifying includes notifying, on the screen, the user of the first sheet holding unit which is used in printing of the second job and the second sheet holding unit which is not used in printing of the second job.

18. The control method according to claim 16, wherein notifying includes notifying, on the screen, the user that the sheet holding unit which is used in printing of the second job is not able to be selected as a sheet holding unit for which the attribute information of the sheet to be used in the first job is to be stored.

19. A non-transitory computer readable storage medium storing a computer program to cause a printing apparatus to perform a control method, the control method comprising:

holding jobs in a job holding unit, wherein each of the jobs is configured to perform printing an image on a sheet which is conveyed from at least one sheet holding unit of a plurality of sheet holding units;

selecting a job from among the jobs held by the job holding unit;

receiving, from a user, an execution instruction to execute the selected job;

performing the job for which the execution instruction is received;

displaying, on a displaying unit, a screen for selecting at least one sheet holding unit of the plurality of sheet holding units for which attribute information of a sheet, to be used in a selected first job, is to be stored; and notifying, on the screen in a distinguishable manner, a user of a first sheet holding unit of the plurality of sheet holding units which is used in printing of a second job and a second sheet holding unit of the plurality of sheet holding units which is not used in printing of the second job.

20. The non-transitory computer readable storage medium according to claim 19, wherein the method comprises at least one of (i) before the execution instruction for the first job is received, on the screen, the user is notified of the first sheet holding unit which is used in printing of the second job and the second sheet holding unit which is not used in printing of the second job, and (ii) on the screen, the user is notified that the sheet holding unit which is used in printing of the second job is not able to be selected as a sheet holding unit for which the attribute information of the sheet to be used in the first job is to be stored.

* * * * *